Sept. 27, 1932.  J. SYLVESTER  1,879,998
SHEET GLASS FORMING AND ANNEALING METHOD AND APPARATUS
Filed Jan. 21, 1929  18 Sheets-Sheet 1
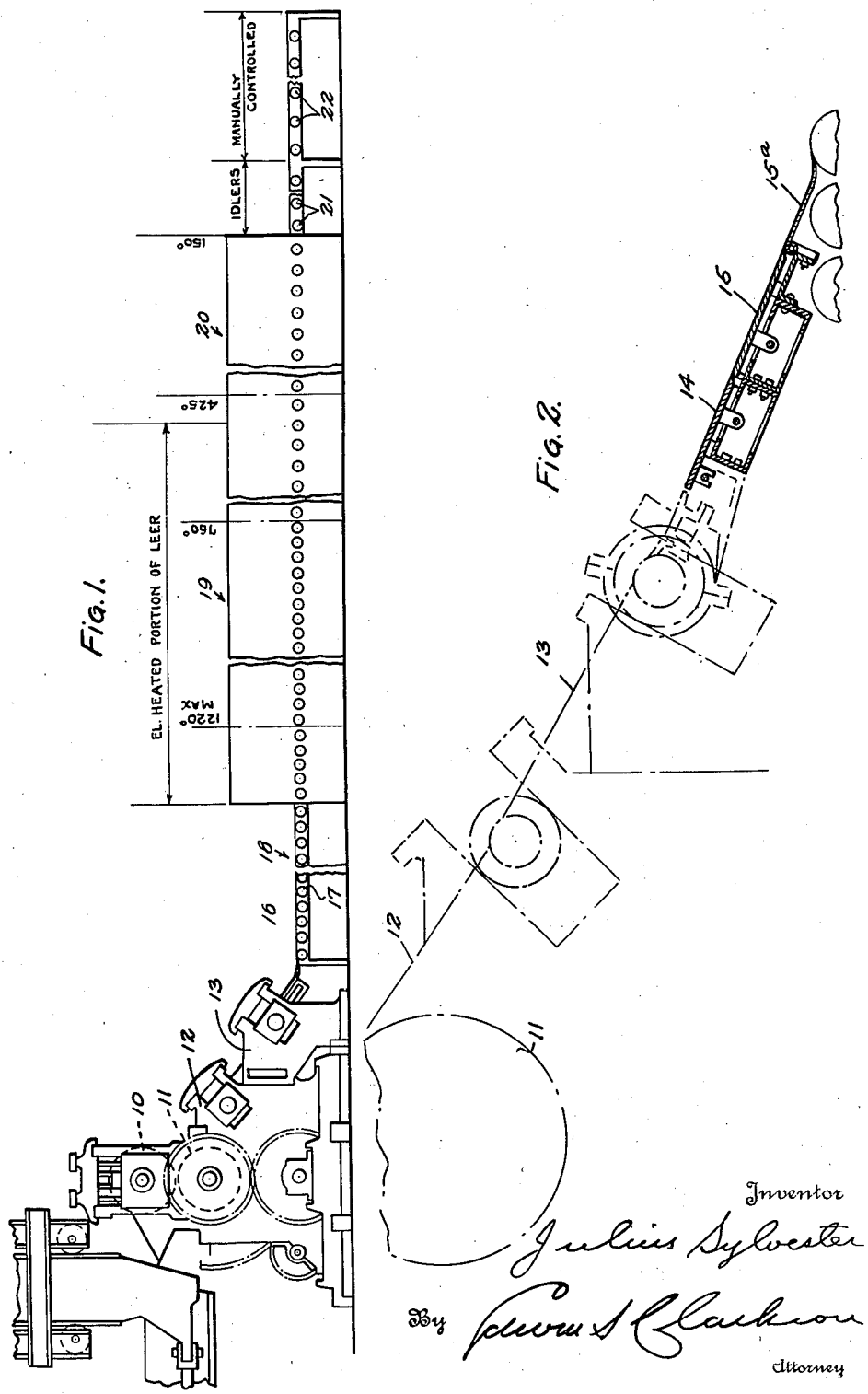

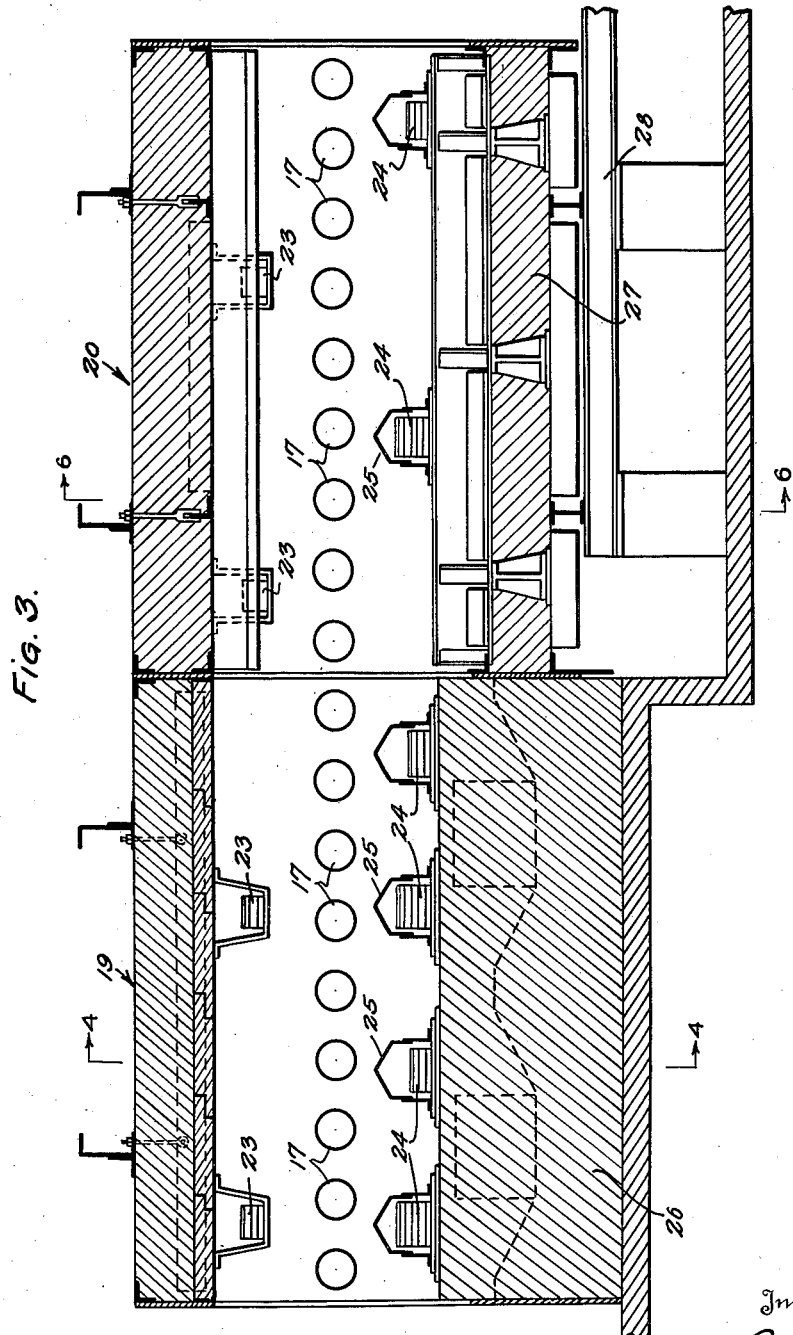

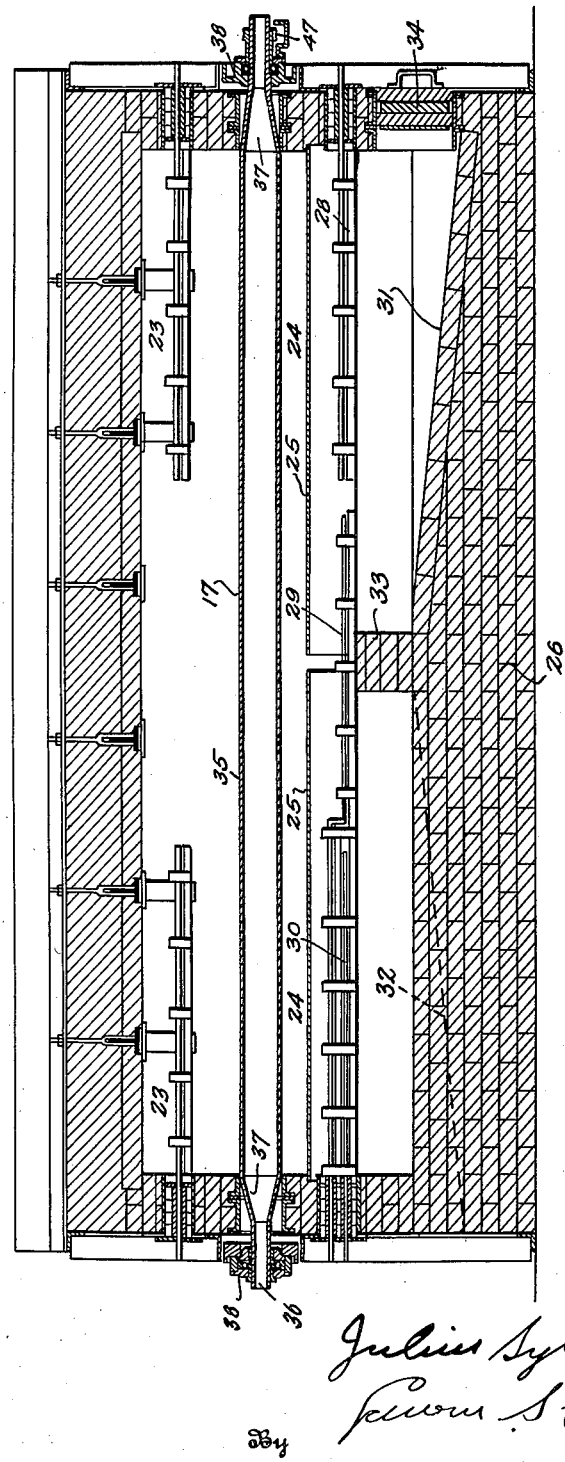

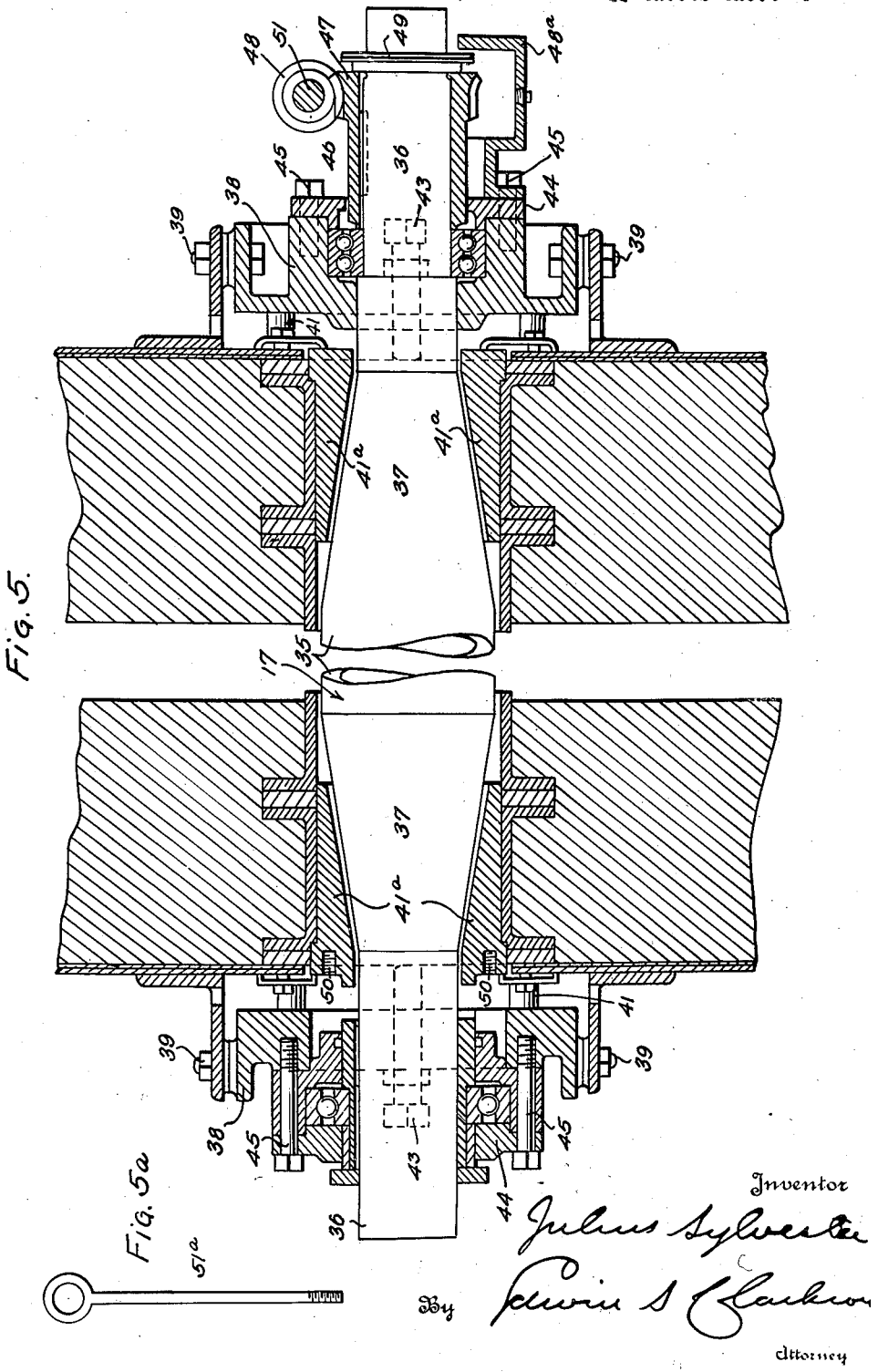

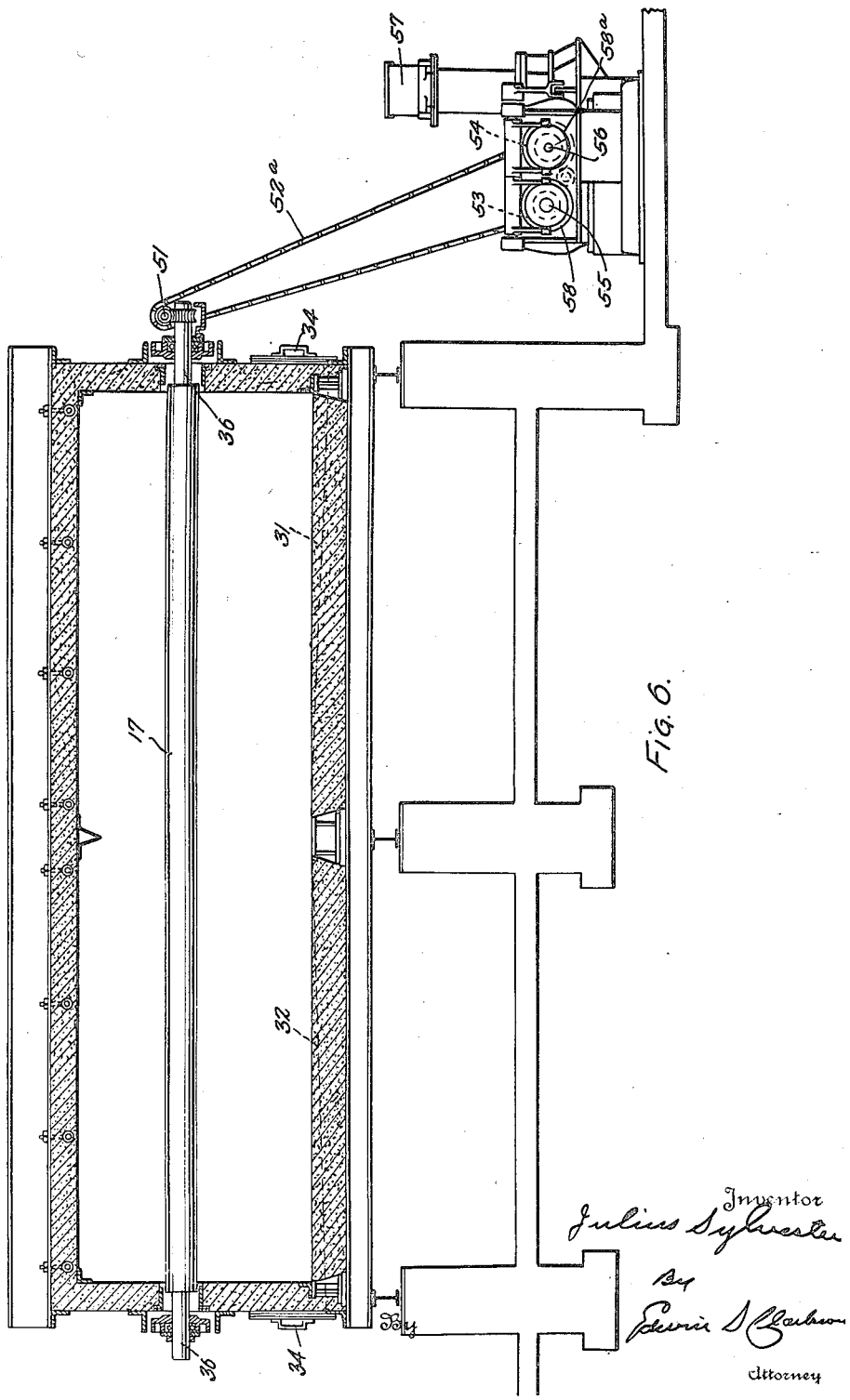

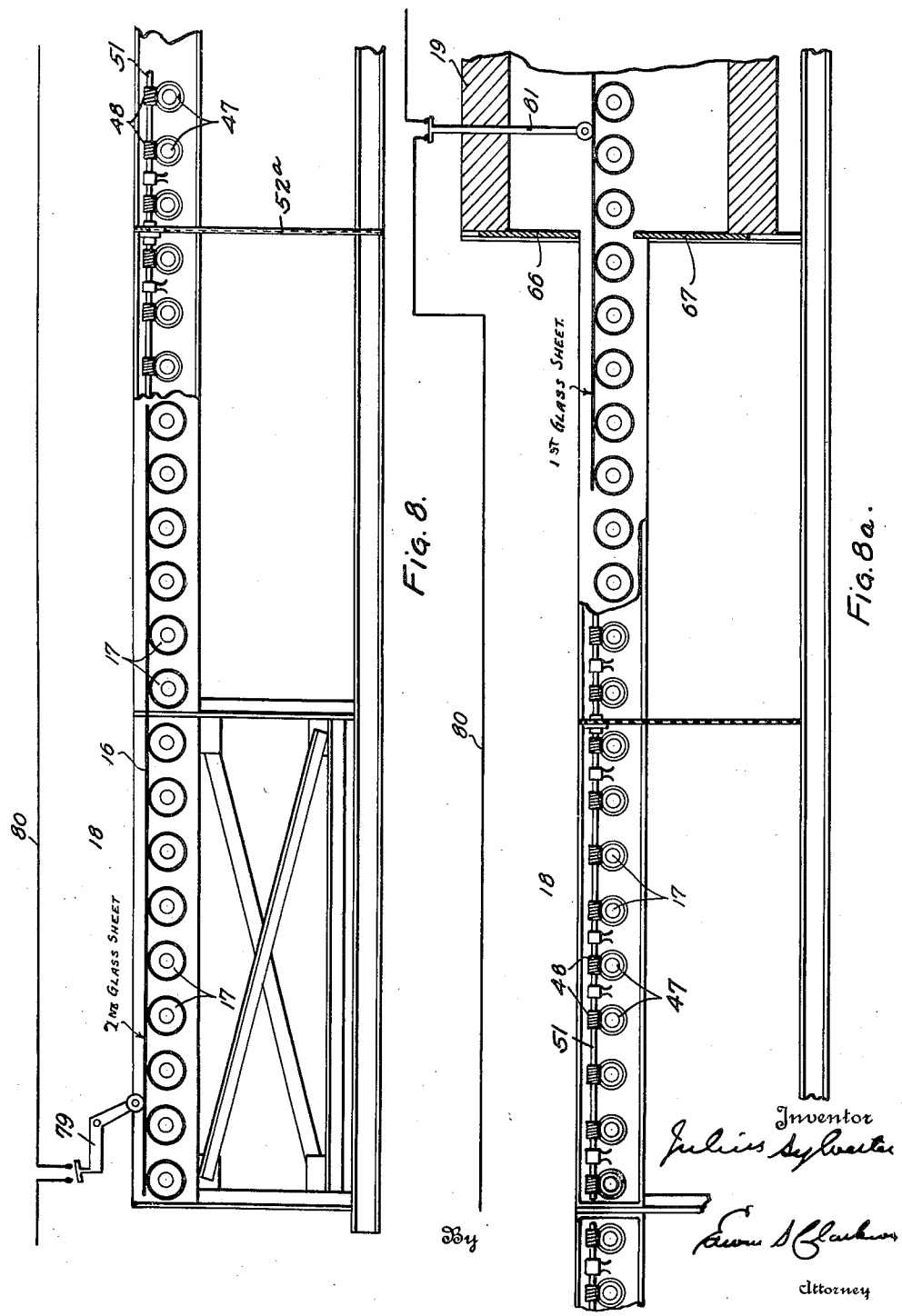

Sept. 27, 1932.  J. SYLVESTER  1,879,998
SHEET GLASS FORMING AND ANNEALING METHOD AND APPARATUS
Filed Jan. 21, 1929  18 Sheets-Sheet 8
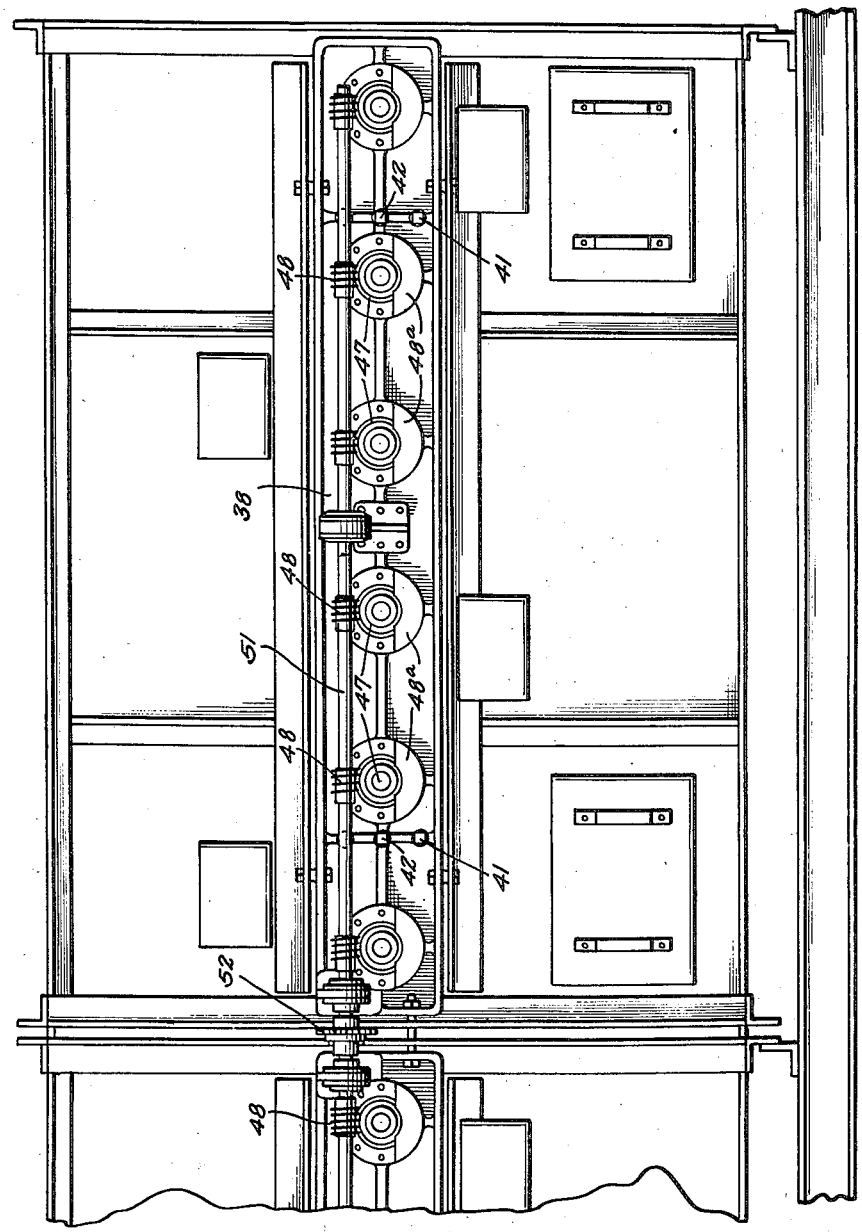
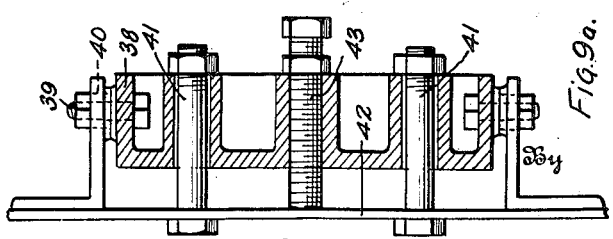

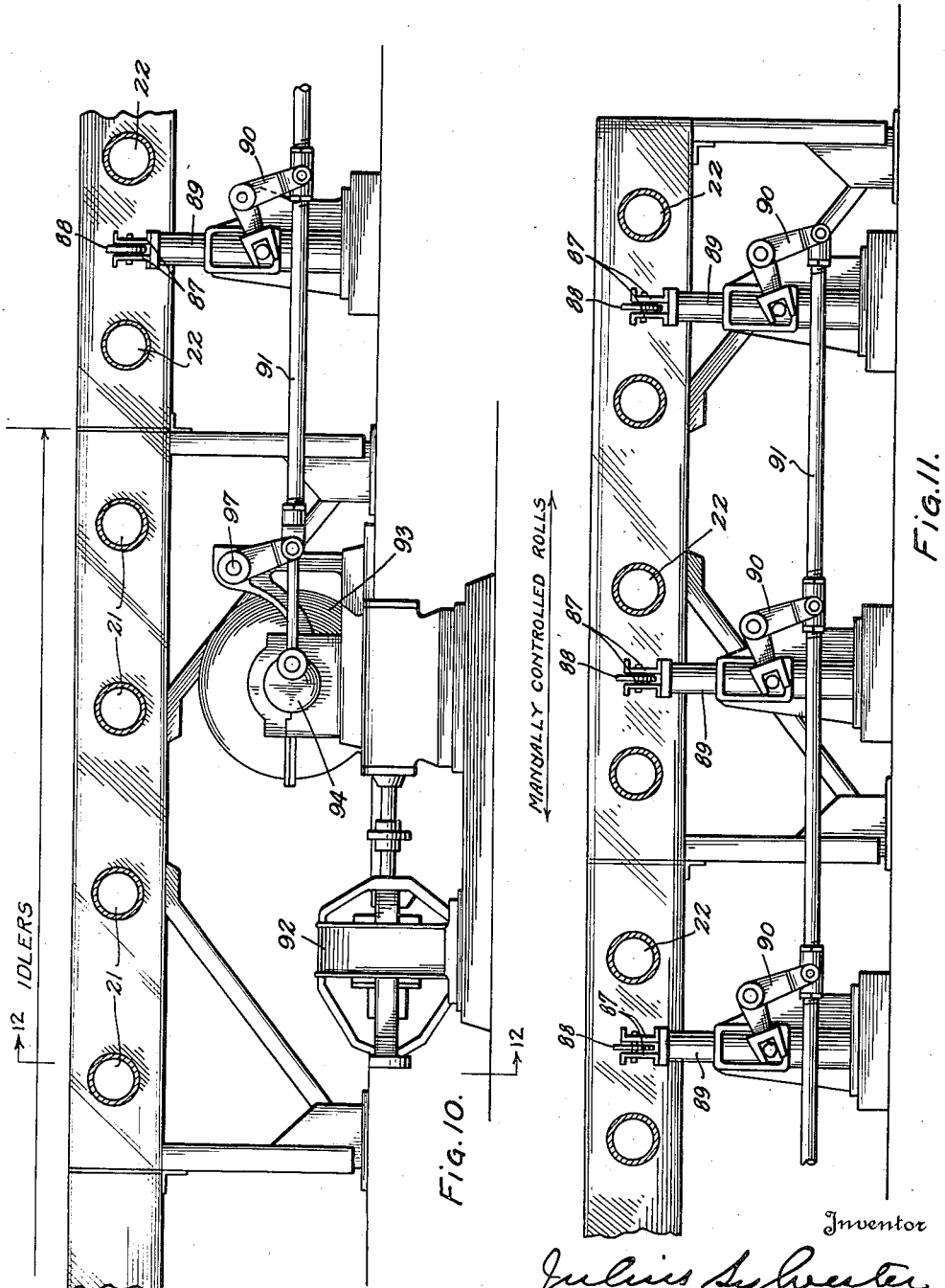

Sept. 27, 1932.  J. SYLVESTER  1,879,998
SHEET GLASS FORMING AND ANNEALING METHOD AND APPARATUS
Filed Jan. 21, 1929  18 Sheets-Sheet 15

Sept. 27, 1932.   J. SYLVESTER   1,879,998
SHEET GLASS FORMING AND ANNEALING METHOD AND APPARATUS
Filed Jan. 21, 1929   18 Sheets-Sheet 16

Sept. 27, 1932.   J. SYLVESTER   1,879,998
SHEET GLASS FORMING AND ANNEALING METHOD AND APPARATUS
Filed Jan. 21, 1929   18 Sheets-Sheet 17

Sept. 27, 1932.   J. SYLVESTER   1,879,998
SHEET GLASS FORMING AND ANNEALING METHOD AND APPARATUS
Filed Jan. 21, 1929   18 Sheets-Sheet 18

Inventor
Julius Sylvester
By
Attorney

Patented Sept. 27, 1932

1,879,998

UNITED STATES PATENT OFFICE

JULIUS SYLVESTER, OF WASHINGTON, PENNSYLVANIA, ASSIGNOR TO SIMPLEX ENGINEERING COMPANY, OF WASHINGTON, PENNSYLVANIA, A CORPORATION OF DELAWARE

SHEET GLASS FORMING AND ANNEALING METHOD AND APPARATUS

Application filed January 21, 1929. Serial No. 333,887.

The invention relates to a sheet glass forming and annealing method and apparatus preferably employing in its practical embodiment a roller type glass annealing leer, for annealing plate or sheet glass, operating in conjunction with a glass rolling apparatus of the intermittent type. One object of the invention is to provide a method of intermittently forming and annealing glass sheets whereby sheets of great length may be rapidly formed and annealed while in contact with supporting means traveling at a surface speed equal to or greater than, i. e., at least as great as, the speed of sheet formation, but in which the supporting means is so operated as to cause the sheets to have a course of travel in the annealing leer of materially greater length than the length of the leer, whereby the rapidly formed sheets may be subjected to annealing treatment for a proper time period to secure a most efficient annealing action without necessitating the use of an annealing leer of undesirable or prohibitive length.

Another object of the invention is to provide a leer of the roller type for use in conjunction with the apparatus for intermittently rolling sheets of glass, in which leer all the rolls are adapted to rotate at a high speed, which may be equal to the rate of sheet formation, and in which a portion of the rolls rotate periodically and successively forward and backward so that the progress of the sheet through the leer as a whole is substantially slower than the rate of sheet formation.

Where a sheet of glass is formed at a relatively high rate of speed (by rolling or any other means) it is very desirable to maintain this speed until such a time as the glass reaches a temperature below the softening point, in order to keep the glass from sagging between the rolls and to obtain a more uniform surface. The grinding operation is thereby reduced to a minimum.

Another object of revolving the rolls as fast as possible is to prevent them from becoming deformed and to reduce the amount of cooling that may be necessary, thereby resulting in a more uniform surface of the glass, due to the fact that the rolls will not impart deformations to the hot glass traveling upon their periphery. Furthermore, the less cooling that is imparted to the rollers the less fuel will be required to maintain the required temperatures in the leer, thereby effecting economies in operation.

The rolls revolve in a tunnel where rather high temperatures are maintained and the speed at which the glass is manufactured will determine whether or not it is necessary to cool the rollers and also the amount of cooling that will be necessary.

The rolls are preferably made of high heat resisting metal, tubular in form so as to get maximum strength under high temperature conditions with minimum weight.

In the manufacture of plate or sheet glass it has been the practice to allow glass to set on a hearth until it has reached a sufficient hardness to prevent sagging and deforming. It was then transferred to the conveyor or leer proper either by hand or by mechanical means, and the sheet was moved forward either continuously or intermittently depending on the mechanical construction. Under this prior system the glass has been rolled in sheets approximately thirty feet long or less and the glass was allowed to remain on the table a sufficient length of time to chill it until it could be handled by hand and shoved on the above hearth. These hearths had three or more stations and the glass was transferred by mechanical means from one station to the other progressively until transferred on to the conveyor as above described.

The method that will be used in connection with the present leer is such as to form a sheet of any desired length, it being cast between rolls which operate at quite a high speed, being conveyed into the leer by means of high speed rollers which would necessitate a leer to be so long as to be impractical, if the glass passed continuously through the leer at this high speed.

The object of the leer is to maintain the high speed necessary to prevent deformation of the glass and to reverse certain of the rolls uniformly and intermittently, dependent entirely on the speed at which the glass must travel to prevent deformation. To describe the process more accurately the glass is poured from pots between the rolls, the casting requiring a given time and there being an interval between casts of a suitable duration of time. Both forward and reverse speed of the glass sheets, which correspond to the peripheral velocity of rolls, are identically the same as that of the glass sheet formation, and the difference in distance traversed by the glass sheet between forward and reverse movement per unit of time is equal to the length of sheet formed, divided by the time required to form one sheet and the interval between formation of sheets. For example, if a sheet of glass is formed every ten minutes and it is eighty feet in length, the forward progress of the glass sheet in the annealing leer is eight feet per minute.

One of the important objects of the invention therefore is to provide a leer composed of a plurality of rolls having means for rotating the rolls at a given speed, and means for periodically reversing the direction of rotation of a predetermined number of the rolls without affecting the speed of rotation. An automatic system for controlling the operation of the rolls is one of the features of the invention.

When the sheet of glass first enters the leer after leaving the glass forming or rolling machine it is desirable that the first rolls of the leer rotate in a forward direction only, while the rolls along the principal portion of the leer are rotating successively and intermittently forwardly and backwardly. In order to prevent buckling of the sheet of glass in passing to the reversing rolls there is provided a set of transfer rolls intermediate the forwardly operating rolls and the intermittently reversing rolls. This set of transfer rolls is first synchronized with the forwardly rotating rolls, and then when the entire sheet is upon the transfer rolls, the movement of these rolls is automatically synchronized with the intermittently reversing rolls in the remainder of the leer. The automatic control of these transfer rolls is another feature of my invention.

In the manufacture of sheet glass in roller leers it is often necessary to remove sheets, in whole or in part, that have proved defective in the casting operation or that have been broken in passage through the leer. In order to accomplish this result in the present device an emergency control is provided which constitutes one of the features of the invention. The rolls of the leer are arranged in a plurality of sections, and by means of the emergency control the rolls in any given section or set of sections may be caused to rotate either forwardly, or rearwardly, or intermittently forwardly and rearwardly. Moreover by the use of my control device the relative periods of forward and rearward rotation may be regulated as desired without changing the peripheral speed of the rolls.

Another feature of my invention consists in providing the leer with independently removable sections.

A further object of the invention is to provide rolls which may be independently removed from the leer without interfering with the driving operation of the remaining rolls.

A further object is to provide an improved heating means whereby the sides of the leer may be heated by heating units separate from those which heat the center of the leer, and also to provide separate heating devices above and below the glass conveying mechanism, whereby uniform heating and annealing may be secured.

A further object of the invention is to provide manually operated doors at the entrance to the leer which may be closed when the leer is not in operation to preserve the heat therein, and which may be opened to permit sheets of glass to pass into the leer.

A further object of the invention is to provide an improved means for removing sheets of glass from the leer conveyors.

A further object is to provide specific mechanism for efficiently accomplishing the desired results enumerated above.

Further objects of the invention will appear hereinafter.

The invention may be more readily understood by reference to the accompanying drawings in which are shown certain desirable embodiments of the invention. It will be obvious that the invention is not to be limited to the particular embodiments shown, as many modifications may be employed without departing from the spirit of the invention.

In the drawings:

Figure 1 is a diagrammatic side elevation of the leer and sheet forming mechanism.

Figure 2 is a diagrammatic view on an enlarged scale, and partly in section, showing the pouring spout.

Figure 3 is a longitudinal sectional view of two adjacent sections of the leer at the juncture between the highly heated portion of the leer and the cooling portion of the leer.

Figure 4 is a transverse section on line 4—4, Figure 3, in the highly heated section.

Figure 5 is a detail view on an enlarged scale, of the detachable roll of Figure 4, and the bearings therefor.

Figure 5a is a detail view showing a special tool employed in removing the rolls shown in Figure 5.

Figure 6 is a sectional view on line 6—6, Figure 3, showing also the driving mechanism for one of the rolls.

Figures 8 and 8a are diagrammatic views illustrating the progress of a sheet of glass through the first portion of the leer.

Figure 9 is a side elevation of one section of the closed portion of the leer showing one of the roll operating shafts.

Figure 9a is a sectional view on an enlarged scale on line 25—25 of Figure 9.

Figures 10 and 11 are side elevations of the cold end of the leer showing the idler rolls and the glass lifting mechanism.

Figures 15, 15a and 15b are diagrammatic representations of the roll driving apparatus.

General assembly

Figure 7:
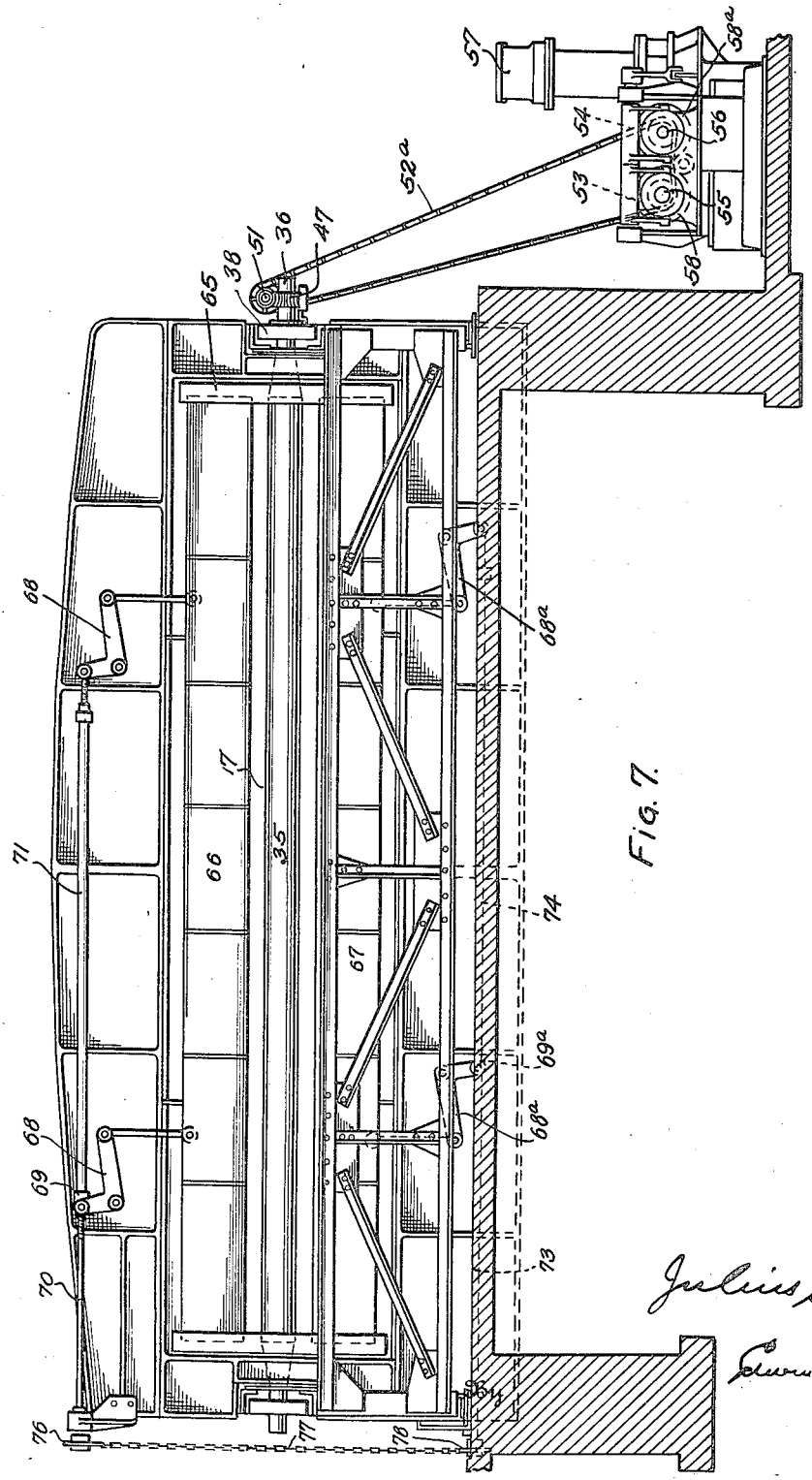
Figure 7 is a front view of the closed portion of the leer showing the slidable doors.

Referring first to Figures 1 and 2, the numerals 10 and 11 denote a pair of rolls of an apparatus for forming sheets or plates of glass. Molten glass is poured between these rolls and passes from them in sheet form to a pouring spout which delivers the sheet to the leer. The pouring spout is shown somewhat diagrammatically in Figure 2 and as shown includes two portion 12 and 13, both of which are angularly adjustable in a vertical plane in order to regulate rate of descent of the glass sheet in accordance with the consistency of the glass as it comes from the sheet forming rolls. The lower portion of the pouring spout is made up of removable sections 14 and 15 so that the length of the pouring spout may be varied as desired by adding or removing one or more sections. This is necessary in order that the spout will reach the leer regardless of the angular adjustment of the spout. A pivoted lip 15a with an upwardly curved end portion delivers the sheet of glass 16 to the rollers of the leer. The pouring of the glass is intermittent, one sheet being poured, and then sufficient time is allowed for this sheet to enter the leer before another is poured.

The leer as indicated diagrammatically in Figure 1, and as shown somewhat more in detail in Figures 8, 8a, 9, 10 and 11, comprises first an open portion 18 along which the sheet of glass 16 is advanced by means of rotating rollers 17 to the closed portion of the leer. Vertically movable doors 66 and 67 at the entrance to the leer (Figures 7 and 8a) are opened at the beginning of the glass making operation to permit the sheets to pass into the leer, but may be closed to prevent loss of heat from the leer when glass is not being annealed.

Referring to Figure 7 the door operating mechanism comprises an upper and a lower pair of bell cranks 68, 68a, which are pivoted intermediate their ends to the frame of the leer. The bell cranks 68 at the left of the leer are attached to blocks 69, 69a, which are internally threaded and are engaged by threaded rods 70 and 73. These rods are rotated by means of wheels 76 and 78 connected and operable by means of a chain 77. The bell cranks 68 and 68a at the right of the leer are connected to the blocks 69 and 69a by means of upper and lower connecting rods 71 and 74.

The closed portion of the leer is heated by suitable means herein shown as electrical heating units 23 and 24 (Figures 3 and 4). This closed portion of the leer is made up of two principal divisions which may be referred to as the highly heated portion 19 and the less highly heated portion 20. Each of these portions is made up of a plurality of sections. The characteristics of the highly heated portion are the more expensive construction designed to prevent heat radiation and the closer spacing of the heating units as indicated in Figure 3, which figure shows the two adjacent sections of the highly heated and cooling portions of the leer. Typical cross sections of the highly heated and cooling portions of the leer are shown in Figures 4 and 6 respectively. The temperatures within the closed portion of the leer may be regulated as desired, but preferably range from a maximum of about 1200° F. at a point near the entrance to the closed portion of the leer, to a temperature of about 150° F. at the end of the cooling portion of the leer.

Figure 13:
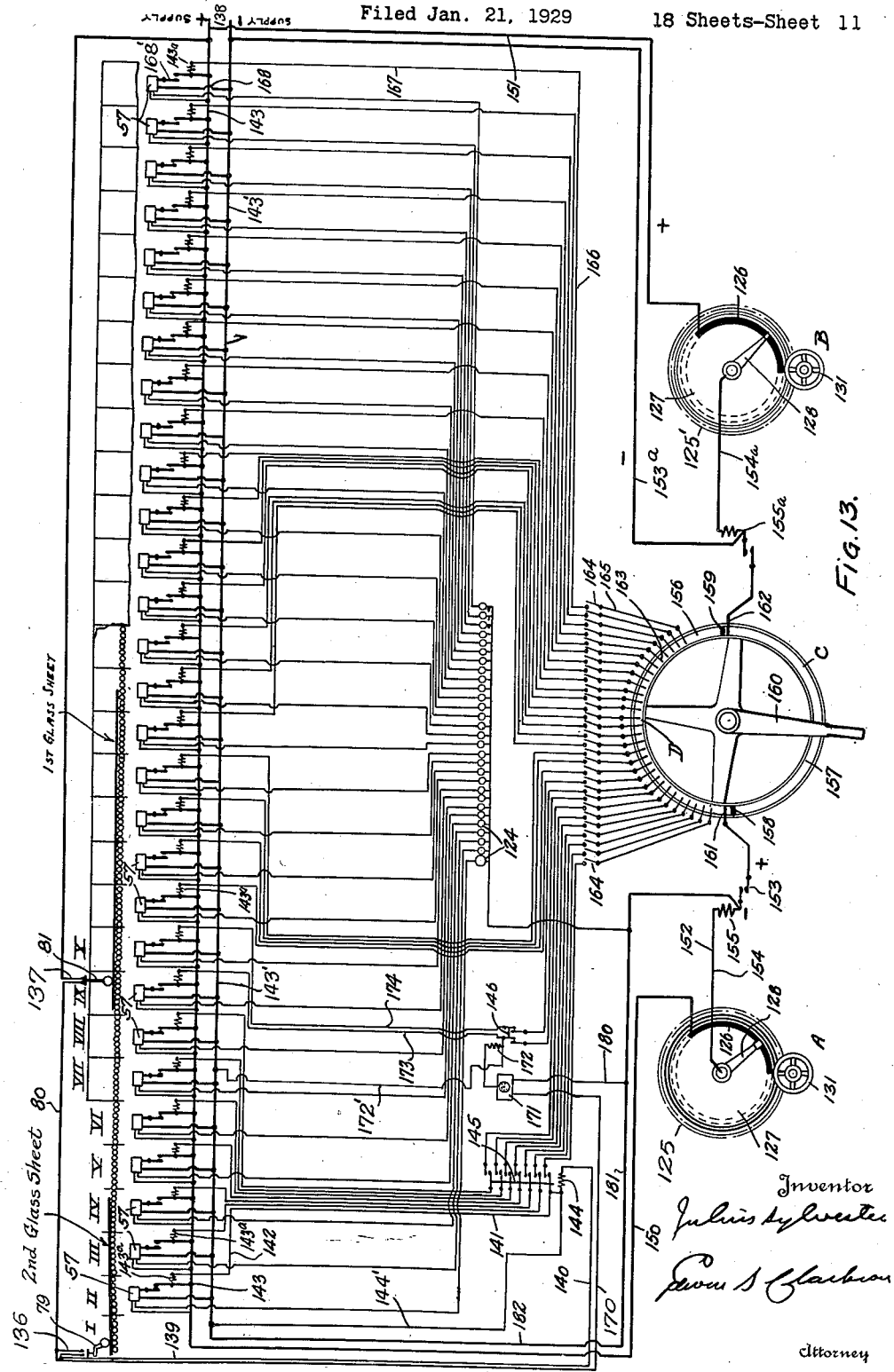
Figure 13 is a wiring diagram of the roll controlling apparatus.

The operation of the conveying rollers 17 in conveying the glass sheets through the leer will be described in greater detail hereinafter in reference to the control mechanism. Briefly set forth however the glass passes first from the rolling machine onto a series of rolls rotating in a forward direction only at a peripheral speed at least as great as the speed of sheet formation, while the rolls in the principal portion of the leer are revolving successively forwardly and then rearwardly, but at a peripheral speed at least as great as the rolls which move forwardly only. These alternately reversing rolls normally rotate in a forward direction for a longer period than in the rearward direction, in order that there may be a general advance of the sheet through the leer as a whole. In order for the sheet of glass to pass from the forwardly moving rolls to the reversing rolls it is necessary to provide an intermediate set of transfer rolls to prevent buckling or breaking of the sheets of glass. These transfer rolls take up first the movement of the first or forwardly moving rolls until the sheet of glass rests entirely upon the transfer rolls. The transfer rolls are then automatically synchronized with the reversing rolls in the remainder of the leer, until the first sheet has passed onto the reversing rolls and another sheet is ready to be transferred from the forwardly moving rolls to the reversing rolls. The transfer rolls are then automatically synchronized with the first or forwardly moving rolls (see diagram Figure 14). This automatic synchronism is accomplished by contact of the glass sheets with switches 79 and 81 in a circuit 80, as shown in Figures 8 and 8a, and as will be more fully described hereinafter by reference to the control diagram (Figure 13).

In passing from the closed portion 20 of the leer the glass is received upon idler rolls 21 (Figures 1 and 10) beyond which are located a plurality of power operated, but manually controlled rolls 22. The length of the idler section is such that a sheet of glass will entirely bridge this section so that one end of the sheet may still rest upon the reversing rollers in the closed portion of the leer, when the other end has reached the manually controlled rolls 22.

The rolls 22 may be operated by a motor 64 (Figures 12 and 15b) which drives the rolls through a chain 83, shaft 84 and worm gearing 85. The motor is started and stopped by means of a hand switch 86. In this manner the glass sheets may be transferred from the leer to the rolls 22, and the rolls 22 are then stopped by cutting off the motor 64.

Figure 12:
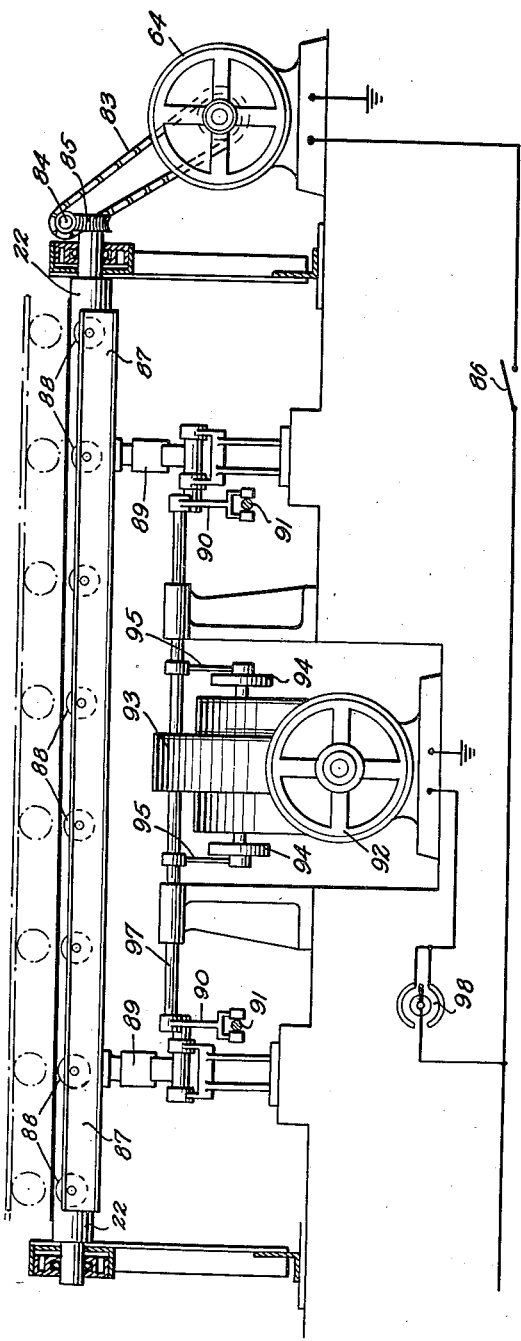
Figure 12 is an end view of the glass lifting mechanism.

For removing the glass from the rolls 22 a power operated lifting mechanism may be employed, the details of which are shown in Figures 10, 11 and 12. As shown the lifting device comprises a plurality of pairs of vertically reciprocable channel bars 87, extending between certain of the rolls 22, and of somewhat less length than the rolls. Between the pairs of bars 87 are carried antifriction rollers 88 which when the bars 87 are raised to the position shown in dotted lines in Figure 12, are adapted to support the plate of glass 16 in such a manner that it may be withdrawn sidewise from the conveyor.

For raising and lowering the channel bars 87 a plurality of plungers 89 may be employed, these being operated by bell cranks 90. These bell cranks are connected to a pair of operating arms 91 extending lengthwise of the leer. Power is furnished from a suitable motor 92, which through reducing gear 93 acts through eccentric 94, links 95, transverse rod and links 97 to move the rods 91 forward or backward to thereby raise or lower the glass lifting rollers 88. The motor is provided with a suitable limit switch 98 which stops the motor whenever the eccentric 94 has moved through an angle of 180°.

The progress of a sheet of glass through the leer has been described in a general way without reference to the specific control mechanism, and without reference to many of the specific details of the device.

To sum up the operation of the mechanism so far described, the glass is formed between rolls 10, 11 (Figure 1) and passed down the adjustable pouring spout to the forwardly revolving rolls of the leer, which rolls are rotating at a peripheral speed sufficiently high to feed the sheets forward at a speed at least as great as the rate of sheet formation. The rolls in the major portion of the leer rotate successively forwardly and rearwardly and the sheet is transferred to these reversing rolls from the forwardly moving rolls by means of automatically synchonized transfer rolls. The purpose of periodically reversing the direction of movement of the rolls within the leer while maintaining a peripheral speed of rotation of said rolls at least as great as the rate of sheet formation, is to obtain the maximum annealing effect for a given length of leer, without slowing up the speed of rotation of the rolls and thereby permitting the glass to sag between the rolls, and permitting deformation of the rolls themselves due to slow rotation. The glass is annealed within the leer by suitable heating devices, and when fully annealed it is gradually cooled and then passed from the leer over idler rolls to manually controlled discharging rolls and thence to a discharge station or table. Here the sheet is lifted by power mechanism and may then be rolled by hand from the table, suitable antifriction devices being provided for this purpose.

Heating of the leer

In order to provide for uniform heating of the leer a special arrangement of electrical heating units has been designed, shown most clearly in Figures 3 and 4. These heating units are arranged in two groups 23 and 24, one above and the other below the conveyor rolls 17. Thus both the top and bottom of the glass passing over the rolls will receive heat. The lower group of heating units is preferably protected from short circuiting by means of covers 25 which prevent broken glass from the rolls from falling upon the heating coils. The units 24 are closely spaced in the highly heated section of the leer, and farther apart in the cooling section. Furthermore, suitable control mechanism (not shown) is provided for regulating the amount of current supplied to the individual units along the length of the leer in order to insure the proper lowering of temperature from the entrance end to the discharge end. The highly heated portion of the leer is provided with solid masonry 26 designed to prevent loss of heat, while the cooling section has a comparatively thin floor 27, supported on framework 28 (Figure 3).

Preferably the units of the lower group of heating coils are arranged in three sections 28, 29, 30, which may be individually controlled. This arrangement, shown clearly in Figure 4, permits the sides of the leer to receive as high a degree of heat as the center. This insures evenness of glass annealing and prevents deformation of the rolls.

*Details of construction of the leer*

Beneath the rolls 17 are cleanout passages 31, 32, which slope from the center of the leer 33 downwardly and outwardly to removable doors 34. This permits the removal of broken glass which falls between the rolls.

Preferably the rolls 17 employed in the leer are of two kinds, the form shown in Figures 4 and 5 being employed in the high temperature portion of the leer, and that shown in Figure 6 being employed in the low temperature section. The high temperature rolls are more suitable for resisting the influence of heat and are of more expensive material than the low temperature rolls.

The rolls of the leer are arranged in sections, any one of which sections may be removed without disturbing the other sections. Moreover the leer itself is made up in sections, as clearly illustrated in Figures 3 and 9, this facilitating repairs.

One of the high temperature rolls is shown in Figure 5, and comprises a cylindrical center portion 35, reduced cylindrical end portions 36 extending through bearing blocks 38, and tapered portions 37 connecting the cylindrical portions 35 and 36. In the low temperature rolls the tapered portions 37 are omitted (Figure 6), but otherwise the construction is the same, though different materials are used for the high and low temperature rolls.

The rolls in each section are carried by detachable and adjustable bearing blocks 38 (Figures 5, 9, 9a, 4 and 6) which are secured to the frame of the leer by means of bolts 39, which pass through slots 40 (Figure 9a). These bearing blocks may be adjusted angularly by means of tension bolts 41 which engage the inside of the leer 42, and compression bolt 43 which engages the outside of the leer. By this angular adjustment of the bearing blocks at the ends of the rolls the rolls themselves may be given a tensioning stress which tends to depress the ends of the rolls and to elevate the centers. The purpose of this tensioning or bending operation is to overcome the deflection of the rolls, especially when highly heated, and the adjustment given the bearing blocks will be just enough to counteract this deflection downward.

The rolls of each adjacent section are operated by a single shaft 51 (Figure 9) which is provided with a plurality of worms 48 meshing with gear 47, carried by the individual rolls. According to my invention each of the individual rolls may be removed without interfering with the operation of the other rolls. The construction which makes this possible is shown in detail in Figure 5.

Referring to Figure 5, it will be noted that the ends 36 of the rolls are carried by removable bearings 44 held in place by bolts 45. The driven end of the roll is provided with a sleeve 46 splined thereto, and carrying the gear 47 meshing with the worm 48. This sleeev is held in place by means of a nut 49. A drip pan 48a is removably secured below the sleeve 47.

For the tapered rolls at the high temperature end of the leer bearing blocks 41a are employed adjacent the tapered portions 37.

To remove the roll the drip pan 48a is first unbolted and taken off, then the nut 49. This permits the sleeve 46 to be withdrawn to the right, due to the curvature of the gear 47. The bearing 44 at the left of the roll may now be unbolted and removed. Then the conical bearing 41a is withdrawn by means of special tools 51a which are inserted into openings 50 provided for that purpose. The roll 17 may then be removed to the left. Preferably, a long rod is inserted through the roll and the roll withdrawn over the rod to prevent the roll from being damaged during withdrawal.

*Motor drive for rolls*

Figure 15:
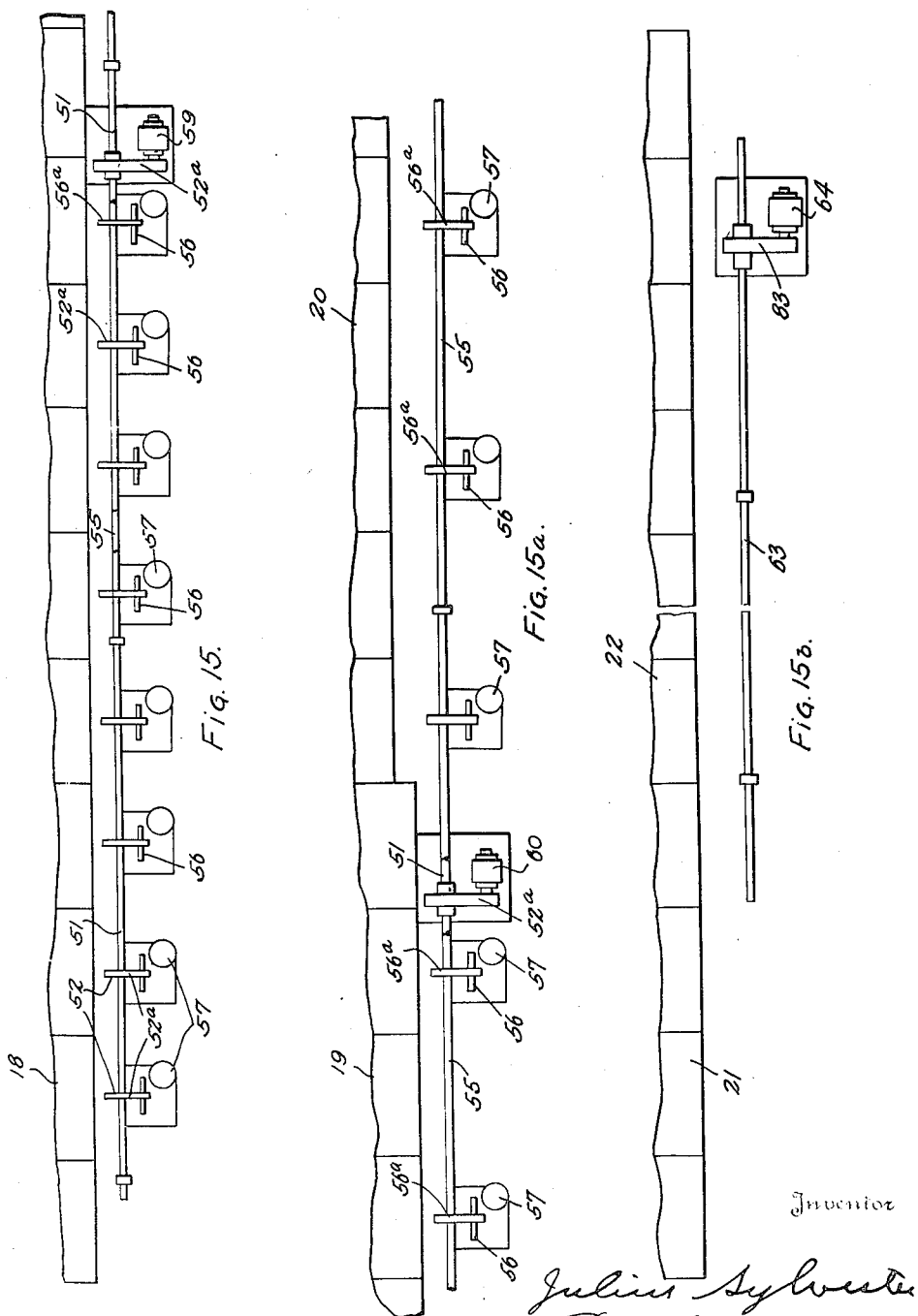
Figure 17:
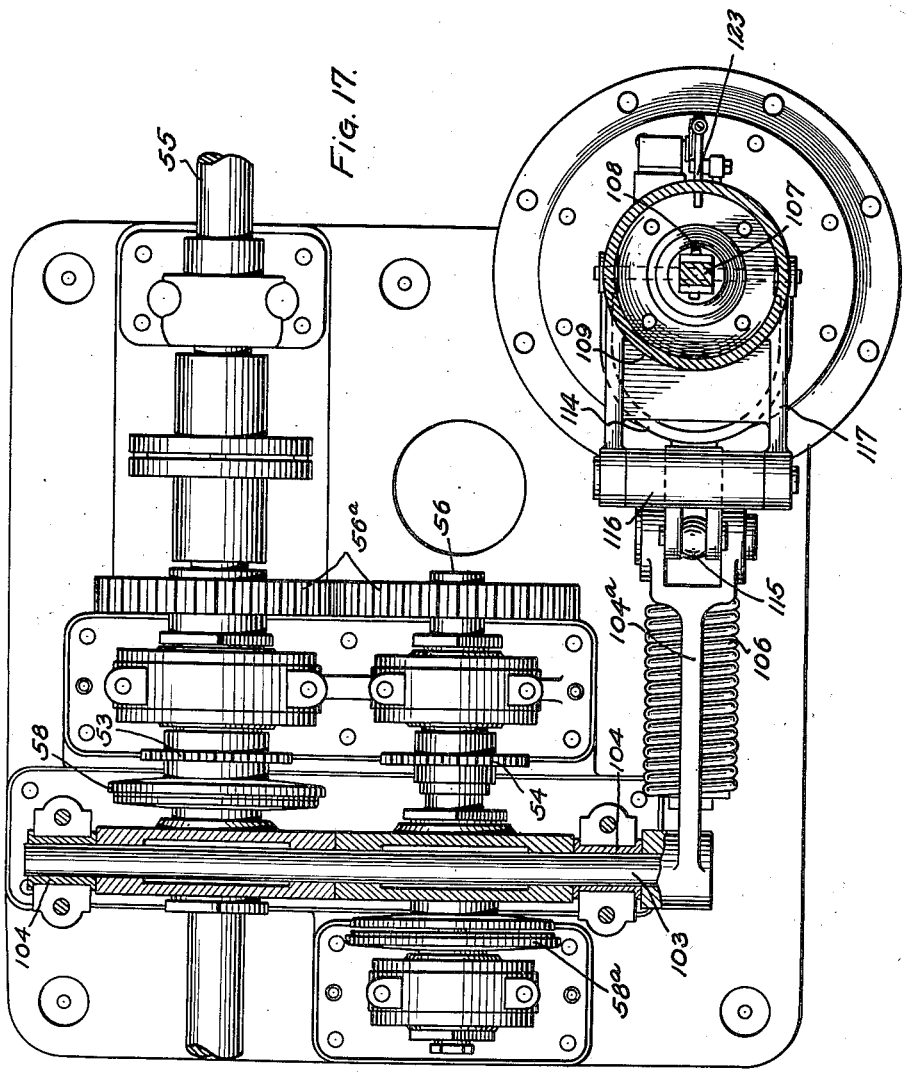
Figure 17 is a view partly in section and partly in plan showing the clutch operating mechanism.
Figure 18:
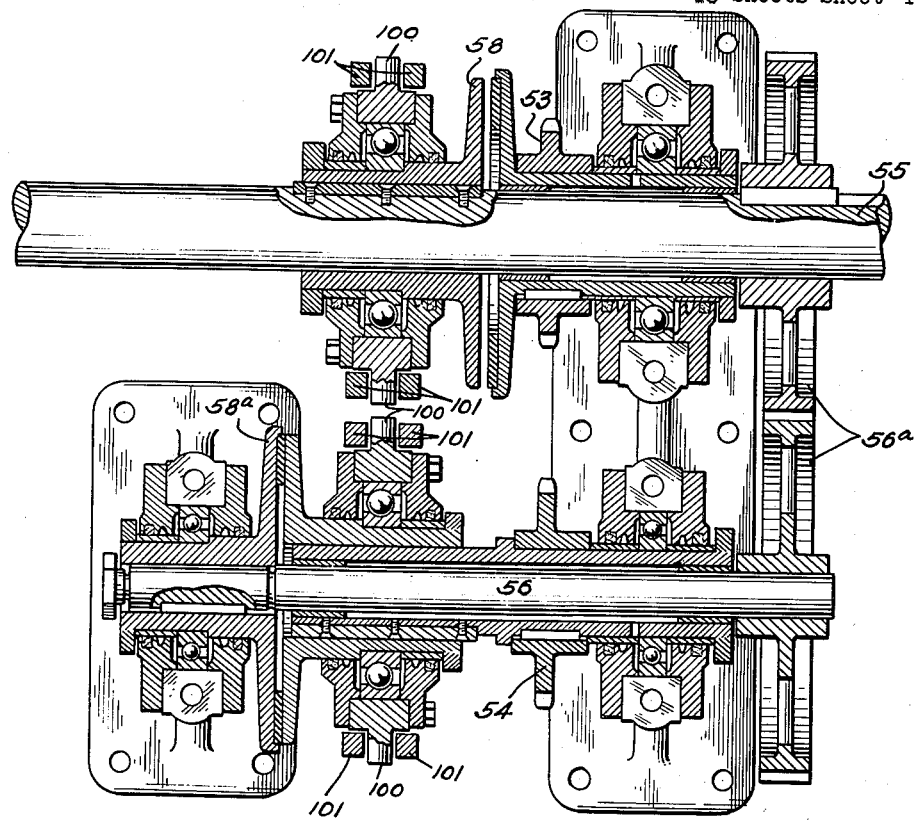
Figure 18 is a horizontal sectional view of the clutch assembly on line 18—18 of Figure 19.
Figure 19:
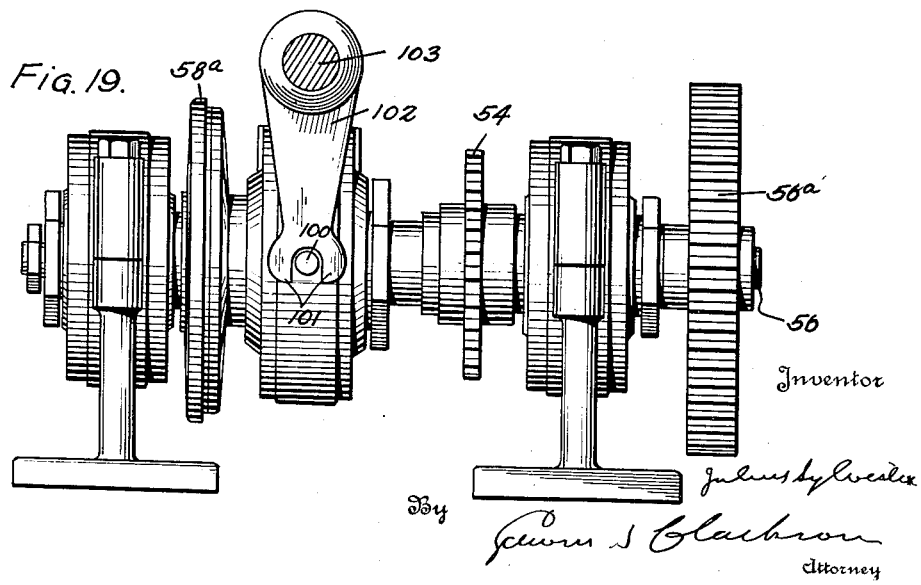
Figure 19 is an end view of the clutch assembly.

The general arrangement of the roll driving mechanism is best shown in Figures 6, 7, 9, 15, 15a, 15b. The rolls of each section in the main portion of the leer are driven by shafts 51, Figure 9, near the center of each of which is located a sprocket 52 which is turned by a chain 52a passing over sprockets 53, 54, Figures 5 and 6, carried by a main shaft 55 and a counter shaft 56 respectively. The sprockets 53 and 54 are caused to rotate with either the main or counter shafts by means of clutches 58, 58a (shown in detail in Figures 16, 17 and 18) which clutches are operated by solenoids 57. As shown in Figure 15, the main shaft 55 extends the entire length of the leer, the counter shafts 56 being geared thereto as at 56a, and rotating in a direction reverse to the main shaft. The main shaft is driven from a plurality of motors 59 and 60 geared thereto, and having pin clutches interposed between the motors and the shaft, whereby any one of the motors may be removed for repairs without interfering with the operation of the leer (Figure 15).

In Figure 15 portions of the leer are represented diagrammatically. The main shaft extends the entire length of the leer proper beginning with the open section 18 and ending at the end of cooling section 20. This shaft is constantly rotating and all the rolls of the leer proper are operated from this shaft or from one of the counter shafts, at a constant peripheral speed equal to the speed of sheet formation. The direction of rotation will be either forward or rearward depending on whether the rolls are operated directly from the main shaft or from the counter shafts.

The main shaft does not extend along section 21 as this section is occupied by idler rolls. In section 22 at the discharge end the rolls are actuated from a shaft 63 by means of a motor 64 which is controlled by the switch 86, as previously described in connection with Figure 12.

*Clutches and clutch operating mechanism*

The clutches and clutch operating mechanism which serve to connect each roller shaft 51 which drives a section of rolls 17, alternately to the main shaft 55 and to the counter shaft 56 to thereby rotate the rollers 17 of one section of the leer alternately in a forward and rearward direction, are best shown in Figures 16, 17, 18 and 19. It will be understood that one set of clutches and operating mechanism therefor is employed for each section of rolls, except the first, and the description of one such mechanism is applicable to all.

As shown the main shaft 55 is constantly geared to the counter shafts 56 and the sprockets 53 and 54 are loosely mounted upon these rotating shafts, but each may be caused to rotate with its respective shaft by means of the clutches 58 and 58a. These clutches are provided with pins 100 which are engaged by fingers 101 of the crank arms 102 carried by a shaft 103 journalled at its ends in bearings 104. The shaft 103 is rotated by means of an arm 104a of a bell crank, the other arm 105 of which is engaged by the spring 106 which tends to operate the clutch 58 upon the main shaft 55; so that when no power is applied to the arm 104a of the bell crank the rolls of this section of the leer will be operated from the main shaft and in a forward direction.

The arm 104a of the bell crank is operated by the solenoid 57 in such manner that when the arm 104a is depressed the clutch 58a causes the sprocket 54 to rotate with the counter shaft 56 and thus produce reverse rotation of the rolls of the section controlled by this solenoid.

Figure 16:
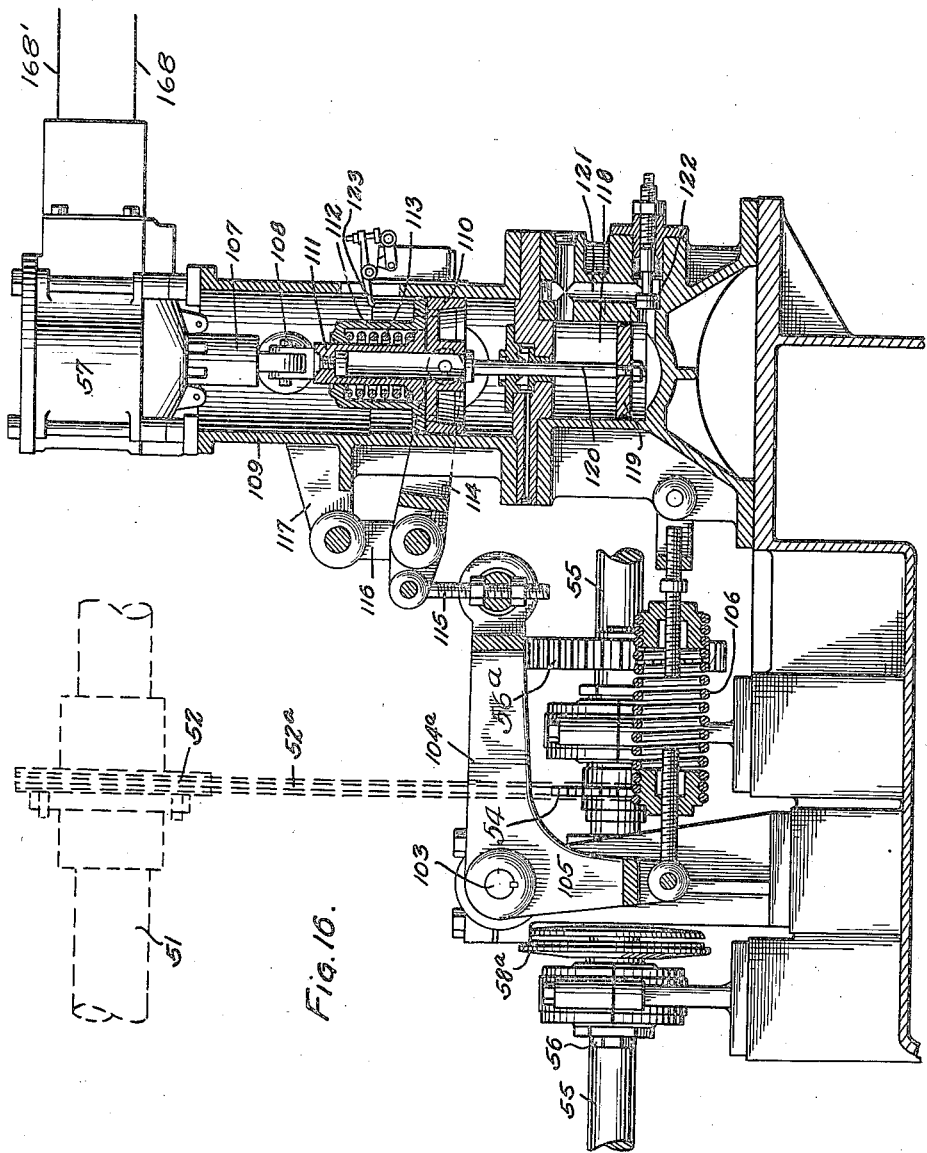
Figure 16 is a detail view partly in side elevation showing the clutch operating mechanism.

As shown in Figure 16 the connection between the core 107 of the solenoid and the clutch operating arm is as follows:—The core 107 is connected by means of a universal joint 108 to a compound plunger reciprocable in a cylinder 109. The compound plunger is composed of an outer plunger 110 and an inner plunger 111, the latter being directly connected to the core of the solenoid, and slidable within a housing 112, of the outer plunger. A spring 113 reacts between the inner plunger and the housing 112. The outer plunger is connected through crank arms 114 passing through slots in the cylinder 109, to an adjustable link 115, which is carried by clutch operating arm 104a. The forked member 114 is pivoted intermediate its ends and is suspended by means of a swinging link 116 to a fixed frame member 117.

Below the cylinder 109 is a dash pot or retarder 118 which is filled with oil or the like under pressure. A piston 119 works in the dash pot and is connected to plunger 110 by means of a piston rod 120. A by pass connection 121 opens above and below the piston 119, which bypass may be cut off to any desired extent by means of a screw operated valve 122. In this manner the action of the piston 119 and of the plunger 110 may be retarded to any desired extent.

The purpose of the retarding action of the dash pot is to prevent jars due to sudden reverse of direction of rotation of the rolls, which might cause breakage of glass. By the use of the retarder the reversal is gradual and without shock.

As shown a finger 123 projects into the cylinder 109 and is engaged by the plunger 110 in either direction of its movement. The finger 123 controls a circuit in which is located a signal light which is designed to indicate to the operator of the leer whether a particular solenoid is in operation. A plurality of such signal lights are shown at 124 in the control diagram, Figure 13.

The solenoid 57 is alternately energized and de-energized by means of a master control switch or timer 125, which timer may through a suitable arrangement of relays and main operating circuits control all of the solenoids of all the roll sections. As shown the timer comprises a dial upon the face of which is located a conductor portion 126 and an insulating portion 127, the two portions making up a complete circle. A rotary contactor or hand 128, which is preferably operated by suitable gearing from the main drive shaft of the leer, engages alternately the conducting portion 126 of the dial, and then the insulating portion 127. During the period of engagement with the conducting portion a circuit is closed through the solenoid, which draws the core 107 upward, and with it the inner plunger 111, which serves to compress spring 113. The spring 113 moves the plunger 110 upwardly, with a delayed action due to the dash pot 118. The upward movement of the plunger 110 depresses arm 104a of the clutch operating mechanism against the resistance of spring 106 and causes the sprocket 54 to rotate with the counter shaft 56, thus producing reverse rotation of the rolls in the section controlled by the solenoid.

As soon as the contactor arm 128 reaches the insulating portion 127 of the control dial the circuit to the solenoid is broken and an action opposite to that just described takes place, and the section of rolls of the leer which had been rotating in a reverse direction are now rotated in a forward direction by the main shaft.

Figure 23:
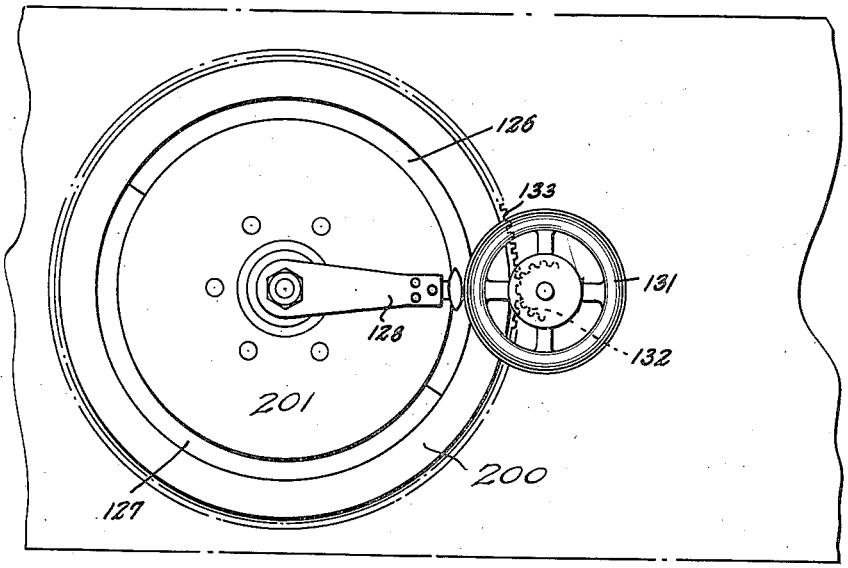
Figures 23 and 24 are enlarged details showing one of the master controls.
Figure 24:
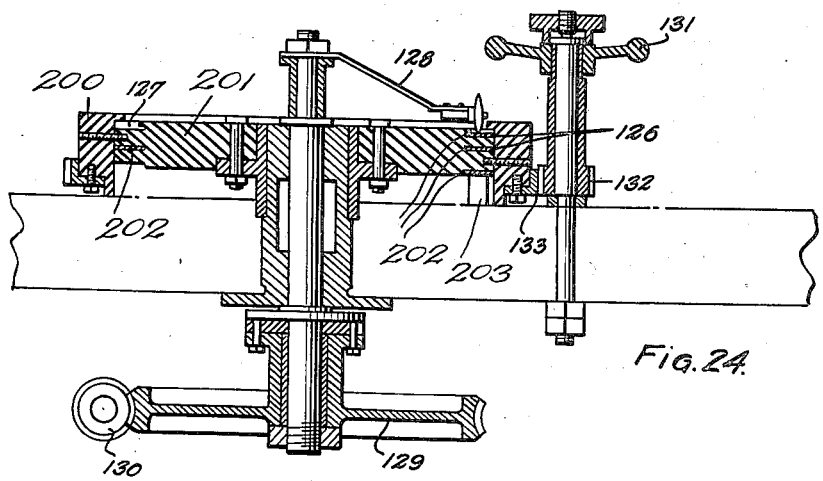

The timer switch is shown in further detail in Figures 23 and 24. In Figure 24 the numeral 129 denotes a gear wheel which is operated through worm 130 and suitable intermediate mechanism from the main drive shaft 55 of the leer for rotating the contactor arm 128.

By regulating the relative lengths of the conducting strip 126 and insulating strip 127 the relative periods of reverse and forward movement of the rolls can be varied at will. Thus, with balanced gear ratios, if the two strips were of equal lengths the rolls would rotate forwardly and rearwardly for equal periods of time, and there would be no progress for a sheet of glass on such rolls. In the normal operation of the lehr the insulating portion of the dial is longer than the conducting portion; thereby the rolls rotate for a greater period forwardly than rearwardly, and there is a gradual advance of the glass sheet through the lehr. It is also possible to cause a general reverse movement of the glass by having the conducting portion of the control switch longer than the insulating portion. It is also possible to cause all the rolls to rotate continuously forwardly or continuously rearwardly by having the arm 128 contact with insulating material only, or with conducting material only. A regulation of the relative effective lengths of the conducting and insulating strips may be accomplished by means of a hand wheel 131 which rotates a gear 132 in mesh with a toothed wheel 133, which serves to regulate the length of time of contact between the arm 128 and the insulating and conducting strips 127 and 126 respectively.

The toothed wheel 133 is connected to an insulating block 200 which latter is connected by means of screws to an insulating block 201. The block 201 has a helical groove 202 to receive the conducting strip 126 which is in the form of a helix, one end being fastened to a stationary part of the lehr, for example, by the bolt 203 whilst the other end is free. By rotating the insulating block 200 by means of the gears 132, 133 the helical conducting strip can be wound into the interior of the insulating block and thereby expose the free end to the desired degree depending on the amount of rotation given to the gears.

Turning the gears in one direction will expose a greater amount of the helical conducting strip, while turning them in the opposite direction will expose a lesser amount of the strip.

*Roll control wiring diagram*

Figure 20:
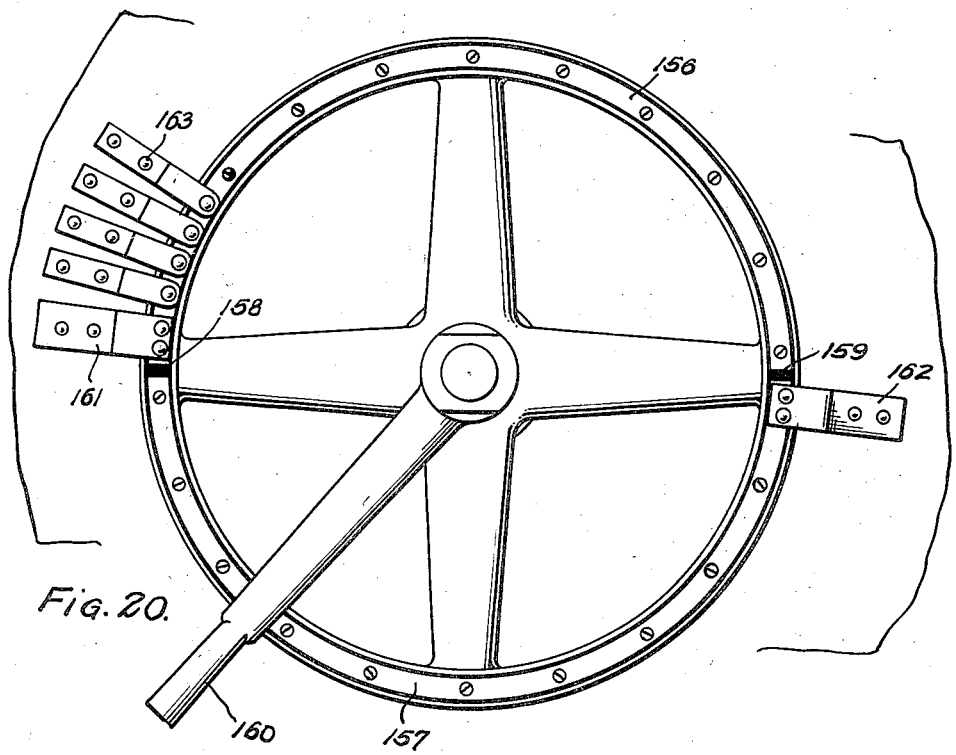
Figures 20, 21 and 22 are detail views on an enlarged scale showing the emergency control device.
Figure 21:
Figure 22:
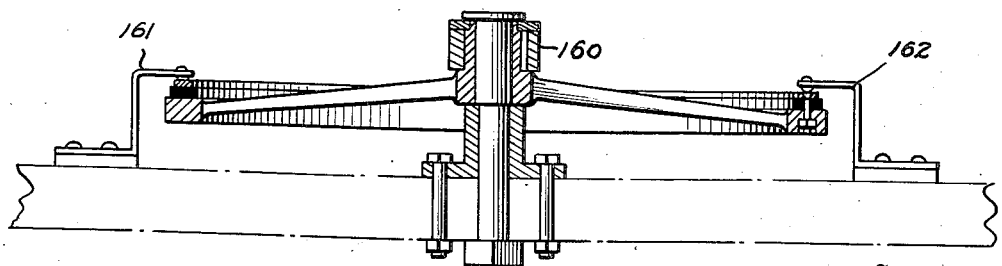

In Figure 13 two master control switches or timers A and B are shown, such as that described in reference to Figure 16. These switches are connected to a positive source of current by means of leads 150 and 151, while the contactors 128 are connected to a negative supply by means of leads 152 and 153. Leads 154 and 154a are provided by means of which additional circuits are closed leading to emergency control switch C through relays 155 and 155a. The details of the emergency control switch are shown in Figures 20, 21 and 22. This emergency control consists of an annular member comprising two conducting halves 156, 157 separated by insulating blocks 158, 159. The annular member may be rotated by means of a handle 160 so as to bring the insulating blocks to any desired position. Contact may be made between master switches A and B and the emergency control C by means of fixed contactor fingers 161 and 162, which may be connected with either section 156 or 157 of the emergency control. In addition to the main contact fingers 161 and 162 there are a plurality of smaller contact fingers 163, each of which controls a circuit through one of the solenoids 57. The number of the contact fingers 163 is equal to the number of solenoids, which in turn is equal to the number of roll sections to be controlled. Manually operated switches 164 are interposed in each solenoid circuit so that any one of the solenoids may be cut out by opening its switch 164. It will be observed that the timer switches A or B operate to cause pulsations of relays 155, 155a and 143a whereby the relays 143a are alternately energized and deenergized to close and open main operating circuits for the solenoids 57 from the main leads 143, 143'. Such a main operating circuit is represented, for example, by wires 168, 168', the latter containing a relay switch 143a energized and deenergized by the closing and opening of circuits including the conductors 150, 152 and 151, 158 by the action of the switches A and B.

A typical circuit from the emergency control device C through the solenoids is represented by the last solenoid circuit at the right of the control device, leading from contact fingers 163 through wire 165, finger switch 164, wires 166, 167, relay 143a and wire 168' connected to line 143, solenoid 57, thence through wire 168 back to the line 143'. The lines through the other contact fingers are the same except that the first nine lines at the left, or any desired number of lines, are provided with auxiliary control switches 145, 146, actuated automatically from the switches 79 and 81, which in turn are operated by the movement of glass through the leer, as previously described briefly in connection with the description of Figures 8 and 8a. These auxiliary control switches 145 and 146 are in addition to the controls in the remaining circuits. When these auxiliary controls are closed the circuits from the emergency control through the solenoids of the first nine lines at the left are identically the same as the circuits for the remaining sections, previously described. When the switches 145 and 146 are open no current is supplied to the solenoids of the first nine lines, and consequently the rolls of the sections controlled by these solenoids are rotating constantly forward. The switch 145 controls the first seven solenoids, and the switch 146 the eighth and ninth solenoids.

By the use of the emergency control device all the contact fingers 163 and consequently, all the solenoids may be placed in circuit with master control A, this arrangement being that shown in Figure 13. By turning the handle 160 of the emergency control slightly to the left so that the insulating blocks will be moved just beyond the main switches 161 and 162 all the solenoids may be placed in circuit with master control B. The master controls may be set for any desired operation of the rolls by regulating the relative lengths of the conducting and non-conduction portions of the dials as previously set forth. Instead of connecting all the lines to one master switch A or B a part of the lines may be connected to one switch, and part to the other master switch by setting one of the insulating blocks 158 or 159 of the emergency control device at a point intermediate the ends of the row of contact fingers 163. Thus by placing insulating block 158 at the finger contact indicated at D the solenoid in the particular line leading from this contact will be cut out of operation. The lines to the left of position D will then be in circuit with master control A, while those to the right will be in circuit with master control B. Assuming that control A is set to produce equal forward and reverse rotation of the rolls and control B is set to produce a general forward movement it will be seen that by the above described operation sheets of glass in rear of a section of broken glass could be prevented from advancing and thus destroying the good sheets, while the sheets of glass in advance of the defective section could be caused to move uninterruptedly out of the leer. Obviously innumerable other modes of operation may be employed depending on emergencies which may arise under actual service conditions. Complete control of all sections of the leer may be had by the arrangement herein described.

It is desirable that in case of failure of any one of the solenoids to operate, this fact may at once be brought to the attention of the operator. For this purpose the signal lights 124 are provided which, as previously set forth, are controlled by switches operated by the plungers of the solenoids so that in case one solenoid is not functioning the corresponding light 124 will go out.

Figure 14:
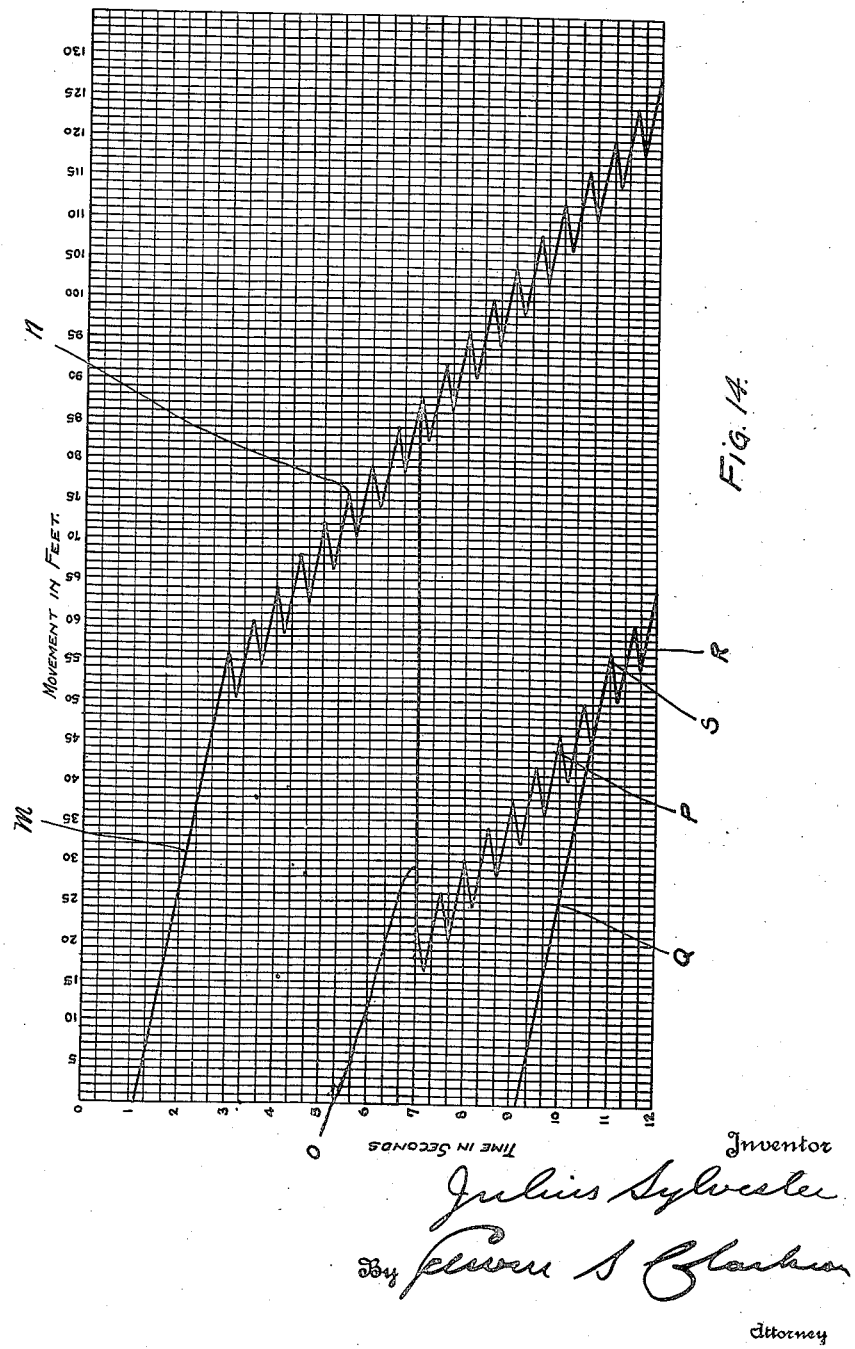
Figure 14 is a graphic representation of the normal progress of a sheet of glass through the leer.

While the leer is capable of flexible operation and emergency control, as above described, the normal operation is that illustrated graphically in Figure 14, in which the movement of the glass in feet is designated by the abscissa at the top of the sheet, and the time in seconds is illustrated by the vertical numerals or ordinates.

In the figure the line M N is intended to represent the movement of the front end of a sheet of glass passing through the leer, the portion M of the line indicating the initial forward movement on the primary and transfer rolls of the leer, while the portion N indicates the intermittent forward and rearward movement in passing through the major portion of the leer. The movement of the rear end of the sheet of glass is indicated by the second line O P, while the third line Q R illustrates a portion of the path of the front end of a second sheet of glass. It will be noted that the path of the rear end first sheet of glass and that of the front end of the second sheet merge at S, and that from there on the movement of the two sheets through the leer is synchronized. The glass for successive sheets is poured at determined intervals of time, as indicated by the graph, but by the time the sheets enter the main portion of the leer and take up the alternate forward and rearward movement they occupy practically the entire space in the leer, the front end of one sheet reaching practically to the rear end of the sheet in front of it. In this manner the leer is operated with the utmost efficiency. Moreover, the alternate forward and rearward movement of the glass gives the effect of a much longer leer than that actually employed, i. e., a travel range for the glass sheets between the entrance and exit ends of the leer which is of a distance greater than the length of the leer, and much more efficient annealing than is possible with any other device, is obtained.

The normal operation of the leer will now be described in connection with the wiring diagram, Figure 13.

As previously set forth the leer is composed of rolls arranged in a plurality of sections. All the roll sections except the first section, are controlled by individual solenoids, the operation of which has already been described.

Reference will now be made to the control of the leer as a whole, including all the sections of rolls from the second section to the end of the closed portion of the leer. As previously stated, the rolls beyond the closed section at the discharge end of the leer are first the idler rolls 21, and then the manually controlled power driven rolls 22, the operation of which has already been described, and which will not be included in the following discussion.

Referring to Figure 13, the rolls of the first ten sections of the leer are indicated by Roman numerals I to X, inclusive, as the operation of these sections is somewhat different from the remaining sections beginning with the eleventh section and extending to the end of the closed portion of the leer. These latter sections during normal operation of the leer rotate successively forward and rearward controlled by their respective solenoids 57, which in turn are controlled by the timer switch A.

At the entrance to the open portion of the leer is the switch arm 79, which as shown in Figure 8 is pivoted intermediate its ends as at 135, whereby, when a sheet of glass enters section I the line 80 will be broken at 136. The second switch arm 81 is located near the entrance to the closed portion of the leer, and closes the circuit 80 at 137 only when the arm 81 is raised by contact with a sheet of glass, the line 80 being normally open at this point.

The first or primary section of rolls I rotates forwardly only and has no solenoid for controlling its operation, this set of rolls being constantly operated from the main drive shaft. Rolls II to VIII, inclusive, are provided with solenoids which are controlled by both the switches 79 and 81, and the rolls IX and X are controlled by the switch 81 alone. The rolls II to X inclusive may be termed the transfer rolls, as their function is to transfer a sheet of glass from the primary set of rolls I which rotates constantly forwardly to the secondary rolls, which comprise most of the leer and extend from the eleventh section on, and which are periodically reversing in direction of rotation. These transfer rolls are necessary to prevent buckling of the sheets, which would occur if a sheet were passed directly from the forwardly rotating rolls to the reversing rolls. The transfer rolls may be automatically synchronized with the primary or constantly rotating rolls, and then with the secondary or reversing rolls.

Before the first sheet of glass is delivered to the leer from the sheet forming mechanism the switch 79 is closed while the switch 81 is open. Therefore, the rolls of the first ten sections are rotating forwardly only, while the rolls in the remaining portion of the leer are rotating successively forwardly and rearwardly. When the first sheet enters section I the switch 79 is opened, which, however, does not change the operation of the first ten sections of rolls, as the circuit is already opened by switch 81. The sheet continues to advance forwardly until its rear end passes from under switch 79, and subsequently the front end closes switch 81. Thus the line 80 is completely closed allowing current to pass from the main line lead 143 at 138 through wires 50, 139, 140, 141, 142, switch 145 and from conductor 144 through a conductor 144' to the main line lead 143'. A magnetic relay is provided in conductor 140 at 144 by means of which when switch 81 is closed switch 145 is operated as above described, thus closing a plurality of circuits which include the solenoids 57 of roll sections II to VIII inclusive, whereby the rolls of these seven sections are synchronized with the rest of the leer and rotate successively forwardly and rearwardly. Likewise the rolls of the ninth and tenth sections rotate in the same manner in synchronism with the rest of the leer, a circuit having been closed from line 143 by means of switch 81 through wire 170, timer 171, relay 172, and through conductor 172' to the main lead 143'. The energization of relay 172 closes switch 146, thus completing the circuit from the emergency control C, from one side of the supply line through wires 173 and 174, thence through relays 143a to the solenoids of the ninth and tenth sections, and back to the other side of the supply line. The action of the timer switches A and B in alternately energizing and de-energizing the relays 142a has been previously described.

At a proper interval after the first sheet is formed, glass is poured for a second sheet, which enters the leer as the first sheet is moving forwardly and rearwardly on the transfer rolls. As soon as the front end of the second sheet reaches switch 79 sections II to VIII inclusive are caused to rotate forwardly only. This movement continues until the rear end of the second sheet has passed from under switch 79, whereupon the circuit is closed. This would cause the rolls in sections II to VIII to commence the reversing movement, except for the fact that the interval between the pouring of the first and second sheets is such that by this time the rear end of the first sheet has passed from under switch 81, thus breaking the circuit at this point and causing the rolls in sections II to VIII to rotate forwardly only. Sections IX and X also take up this forward movement after a delayed interval, which allows the first sheet to pass entirely from these two sections, the delayed action being due to the timer 171, which controls the solenoids of sections IX and X, this timer being connected to the negative line 143' by means of wires 180, 181 and 182, as shown, and through relay 172, wires 173 and 174 and associated relay 143a, the solenoids of said sections and the positive line 143. When the front end of the second sheet reaches the switch 81 sections II to X, inclusive, take up the reversing movement in synchronism with the rest of the leer. This synchronism of the transfer rolls with the constantly forwardly moving rolls of the first section and then with the reversing rolls in the remainder of the leer continues as each additional sheet of glass is produced by the sheet forming mechanism, unless the operation is varied by the action of the emergency control device, as hereinbefore described.

The practical operation of a lehr constructed in accordance with this invention makes it possible to produce sheets of a given thickness of a greater length than it is possible to produce by other machines of the same type designed for the intermittent rolling out of glass into sheet form from a batch of molten glass. My improved method and machine also allows thinner glass to be made than has been hitherto possible by rolling methods and this thinner glass has such a high degree of flatness and uniformity of thickness and smoothness as to reduce to a minimum the amount of grinding and polishing work necessary to put the sheets in the best marketable shape, whereby the quantity and quality of the product is materially increased and the cost of manufacture materially reduced.

There is a decided advantage in constructing the leer in sections. For instance, if a section becomes defective, or it is necessary to remove a section for any reason, this may be done without any destructive effort whereby the expense of repair is limited to the repair itself.

What I claim is:

1. The combination with apparatus for intermittently forming sheets of glass, of a roller leer in which all the rolls rotate at a speed at least as great as the rate of sheet formation, and a portion of the rolls rotate successively forward and backward whereby the progress of the sheet through the leer as a whole is substantially slower than the rate of sheet formation.

2. The combination with apparatus for intermittently forming sheets of glass, of a roller leer in which all the rolls rotate at a peripheral speed at least as great as the rate of sheet formation, said leer comprising a primary section for receiving the sheets from the forming apparatus, in which the rolls rotate constantly in a forward direction, a secondary section in which the rolls rotate successively forward and backward, and a transfer section intermediate the primary and secondary sections, within which the rolls successively operate in synchronism with the primary section and then with the secondary section, whereby a sheet of glass may be transferred from the primary section to the secondary section.

3. The combination with an apparatus for intermittently forming sheet glass, of a roller leer for annealing the sheets of glass therefrom, means for rotating all the rolls of the leer at a given speed, and means for periodically reversing the direction of rotation of certain of the rolls of the lehr so as to give a differential back and forward movement to the sheet such that the sheet travels a greater distance forward than backward, whereby to increase the distance and time period of travel of the sheets through the lehr.

4. The combination with an apparatus for intermittently forming sheets of glass, of a leer comprising an open section adjacent the sheet forming apparatus, a highly heated section adjacent the open section, a closed section adjacent the highly heated section for gradually cooling the glass, power operated rolls in all the aforesaid sections rotating at a peripheral speed at least as great as the speed of sheet formation, automatic means for intermittently reversing the direction of rotation of the rolls within the closed section, an open section beyond the discharge end of the closed portion of the leer, idler rollers immediately adjacent the closed portion, manually controlled power driven rolls beyond said idler rolls, and lifting means for raising a sheet of glass from the manually controlled rolls, said lifting means having idler rollers whereby the glass may be rolled by hand from the lifting device.

5. The combination with an apparatus for intermittently forming sheets of glass, of a leer having rolls for supporting and feeding the glass sheets, a constantly driven power shaft for rotating all the rolls at a given peripheral speed at least as great as the speed of sheet formation, means for periodically reversing the direction of rotation of said rolls, and means for selectively controlling all or a portion of said rolls to cause them to rotate forwardly or rearwardly, or intermittently forwardly and rearwardly.

6. The combination with an apparatus for intermittently forming sheets of glass, of a leer having rolls for supporting and feeding the sheets, means for rotating all said rolls at a constant peripheral speed at least as great as the speed of sheet formation, a normal control means for said rolls whereby the rolls at the entrance end of the leer rotate constantly forward, while the remaining rolls are periodically reversed in direction of rotation, and an emergency control for varying the operation of any portion of said rolls, whereby they may be caused to rotate forwardly only, rearwardly only, or periodically forwardly and rearwardly.

7. The combination with an apparatus for intermittently forming sheets of glass, of a leer having rotatable rolls for supporting and conveying the sheets of glass, a single rotating main shaft extending parallel to the leer and furnishing power for all the rolls to drive the rolls at a surface speed at least as great as the speed of sheet formation, countershafts geared to the main shaft and rotating in the opposite direction, but at a speed for driving the rolls at a speed at least as great as the rolls are driven by the main shaft, and means for periodically connecting a portion of said rolls successively to the main shaft and to the countershafts.

8. The combination with an apparatus for intermittently forming sheets of glass, of a leer having rotatable rolls for supporting and conveying the sheets of glass, a single rotating main shaft extending parallel to the leer and furnishing power for all the rolls to drive the same at a surface speed at least as great as sheet formation speed, countershafts geared to the main shaft and rotating in the opposite direction, but at a speed for driving the rolls at a speed at least as great as that at which they are driven by the main shaft, means for periodically connecting a portion of said rolls successively to the main shaft and to the countershafts, and means for varying the period of connection between the rolls and the shafts, whereby the rate of movement of the glass sheet through the leer as a whole may be varied as desired.

9. The combination with an apparatus for intermittently forming sheets of glass, of a leer having rolls for supporting and advancing the sheets of glass therethrough, said rolls being arranged in sections, a main shaft for furnishing power for all said rolls to drive the same at a speed at least as great as sheet formation speed, countershafts geared to said main shaft and rotating in the opposite direction thereto, and means for periodically and successively connecting the rolls in a given section to the main shaft and to a countershaft.

10. The combination with an apparatus for forming sheets of glass, of a roller leer in which all the rolls rotate at a speed at least as great as the speed of sheet formation, and a portion of the rolls rotate successively forward and backward whereby the progress of the sheets through the leer as a whole is substantially slower than the speed of sheet formation.

11. The combination with an apparatus for intermittently forming sheets of glass, of a roller leer in which the rolls rotate at a speed at least as great as the rate of sheet formation and in which an initial portion of the rolls rotate constantly forward and a succeeding portion of the rolls rotate successively forward and backward whereby the progress of the sheet through the leer as a whole is substantially slower than the rate of sheet formation.

12. The combination with an apparatus for intermittently forming sheets of glass, of a roller leer in which all of the rolls rotate at a speed at least as great as the rate of sheet formation, and a portion of the rolls rotate successively forward and backward whereby the progress of the sheet through the leer as a whole is substantially slower than the rate of sheet formation.

13. The combination with apparatus for forming sheets of glass, of a roller leer in which the rolls rotate at a speed at least as great as the rate of sheet formation, and an initial portion of the rolls rotate constantly forward and a succeeding portion of the rolls rotate at periods alternately forward and backward so as to cause the sheets to move a greater distance forward than backward.

14. The combination with an apparatus for forming sheets of glass, of a roller leer, means for rotating the rolls of the leer to convey the sheets through the leer, and means for periodically reversing the direction of rotation of some of the rolls so as to periodically cause the sheets to move backward and then to move forward a greater distance than backward.

15. The combination with an apparatus for intermittently forming sheets of glass, of a roller leer for annealing the glass sheets, a power shaft for the rolls constantly driven in one direction for rotating the rolls at a given peripheral speed, and means for periodically reversing the direction of rotation of some of the rolls for such time period with relation to their succeeding period of forward rotation as to cause the sheets to alternately move backward and then forward a greater distance than backward.

16. The combination with an apparatus for intermittently forming sheets of glass, of a roller leer for annealing the glass sheets, a power shaft common to all of the rolls of the leer, constantly driven in one direction for rotating said rolls at a given peripheral speed, and means for periodically reversing the direction of some of the rolls for such time period with relation to their succeeding period of forward rotation as to cause the sheets to alternately move backward a given distance and then move forward a greater distance.

17. The combination with an apparatus for intermittently forming sheets of glass, of a roller leer for annealing the glass, means for rotating all of the rolls of the leer at a constant peripheral speed, and a normal control means for said rolls whereby the rolls at the entrance end of the leer rotate constantly forward, while the remaining rolls are periodically reversed in direction of rotation.

18. The combination with an apparatus for intermittently forming glass sheets, a roller leer for annealing the glass sheets comprising a plurality of rolls, means for rotating all of said rolls at a constant peripheral speed at least as great as the speed of sheet formation, a normal control means for said rolls whereby the rolls at the entrance end of the leer rotate constantly forward, while the remaining rolls are periodically reversed in direction of rotation, and an emergency control for varying the operation of any portion of said rolls, whereby they may be caused to rotate forwardly only, rearwardly only, or periodically forwardly and rearwardly.

19. The combination with an apparatus for intermittently forming glass sheets, a leer having rotatable rolls for supporting and conveying sheets of glass through the leer, a single rotating main shaft extending parallel to the leer and furnishing power for all of the rolls to drive the same at a speed at least as great as the speed of sheet formation, counter shafts geared to the main shaft and rotating in the opposite direction, but at the same speed as the main shaft, means for periodically connecting a portion of said rolls successively to the main shaft and to the counter shafts, and means for varying the period of connection between the rolls and shafts, whereby the rate and direction of movement of the glass sheet through the leer as a whole may be varied as desired.

20. The method of forming and annealing sheet glass, which consists in intermittently forming glass sheets, conducting the formed sheets through an annealing course, and causing each sheet to periodically move backward and forward in such manner that its forward movement definitely exceeds its backward movement.

21. The method of forming and annealing sheet glass, which consists in intermittently forming the sheets, conducting the sheets through an annealing course, and periodically moving each sheet alternately a short distance backward and then a greater distance forward at points in its travel along the course so that its distance of travel through the course will definitely exceed the length of the course.

22. The method of forming and annealing sheet glass, which consists in intermittently forming the sheets, conducting the sheets through an annealing course, and periodically causing each sheet to alternately move backward and forward in timed order to cause the sheet to move forward a greater distance than backward.

23. The method of forming and annealing sheet glass, which consists in intermittently forming the sheets, feeding the sheets forwardly at a speed at least as great as the formation speed along the initial portion of an annealing course, and feeding each sheet forwardly along the remainder of the course while periodically shifting it backwardly so that the progress of the sheet along the course as a whole will be substantially lower than the rate of sheet formation.

24. The method of forming and annealing sheet glass, which consists in simultaneously forming and feeding the sheets by means moving at high surface speed in a forward direction along the initial portion of an annealing course, and feeding the sheet along the remainder of such course by means moving generally at a surface speed at least as great as said forming and feeding means but operating to transport the sheets a distance greater than the distance between the initial portion of the course and the end of the course as a whole.

25. The method of forming and annealing sheet glass, which consists in intermittently forming the sheets at predetermined intervals, moving the sheets forwardly along the initial portion of an annealing course by means moving at a surface speed at least as great as the formation speed, and moving the sheets along the remainder of the annealing course by means moving normally at a rate of speed at least as great as the speed of the first-named means but acting on the sheets in such manner that their rate of progression along such portion of the course will be at a rate less than the rate of sheet formation.

26. The method of forming and annealing sheet glass, which consists in periodically forming sheets of glass, feeding each sheet as formed uninterruptedly at a predetermined speed in a forward direction along a continuous annealing course for a determined portion of such course, and then continuing the feed of the sheet with periods of interruption to its forward progress along the remainder of said course.

27. The method of forming and annealing sheet glass, which consists in periodically forming sheets of glass, moving the glass forwardly at a speed at least as great as the speed of sheet formation along an initial portion of an annealing course, and then feeding the sheet periodically backward and forward in successive steps, one shorter than the other, during the remainder of the annealing course, whereby the sheets are caused to have a lower rate of progress along the latter-named portion of the course than along the initial portion of the course.

28. The method of forming and annealing sheet glass, which consists in intermittently forming sheets of glass at predetermined intervals, feeding the sheets in a forward direction as fast as formed and without interruption along the initial portion of an annealing course, and feeding the sheets by intermittent forward steps along the final portion of the course so as to have a rate of progression on this part of their travel less than their rate of progression along the initial portion of the course.

29. The method of forming and annealing sheet glass, which consists in intermittently forming sheets of glass at predetermined intervals, feeding the sheets as fast as formed and at a speed at least as great as the speed of formation without interruption in a forward direction along the initial portion of an annealing course, and then continuing the movement of the sheets along the final portion of the annealing course during which each sheet is caused to reverse its travel a plurality of times so as to retard the progress of such sheet relative to a sheet traveling along the initial portion of the course and thereby bring the sheets closer together during an early stage of the final portion of the course and to increase the range of travel of the sheets from end to end of the course to a distance greater than the length of the course.

30. The method of forming and annealing sheet glass, which consists in intermittently rolling out glass sheets at predetermined intervals by rolling means having a predetermined high speed rate of formation, moving the sheets successively as formed and without interruption in a forward direction along the initial portion of an annealing course by surface contact with impelling elements having a surface speed at least as great as the speed of sheet formation, moving the sheets along the final portion of the course by surface contact with impelling elements having a surface speed substantially equal to the speed of sheet formation, and periodically reversing the direction of travel of the latter-named impelling elements so as to give the sheets a mean rate of travel less than sheet formation rate along said final portion of the course.

31. The method of forming and annealing sheet glass, which consists in periodically forming glass sheets, and conducting the sheets through an annealing course in relatively high and low speed stages, during which latter their rate of forward progression is reduced by causing them to periodically reverse their direction of travel.

32. In an apparatus for forming and annealing sheet glass, means for periodically forming sheets of glass, a leer, roller means for feeding the sheets forwardly at a rate of speed at least equal to formation speed along an initial portion of the leer, roller means for feeding the sheets forwardly along the remainder of the leer while periodically moving the sheets backwardly to reduce their general rate of progression to a degree below the rate of sheet forming speed, and means for so operating the roller means.

33. In an apparatus for manufacturing sheet glass, a leer, forming rolls for periodically forming sheets of glass, a primary set of rolls for feeding the glass sheets as formed and at a rate of speed at least as great as formation speed from the forming rolls along an initial portion of the leer, a set of rolls for feeding the sheets along the remainder of the leer, a set of intermediate rolls for transferring the sheets from the first-named set of rolls to the second-named set of rolls, means for driving all the rolls, means for periodically reversing the direction of rotation of the second set of rolls, and means for periodically reversing the direction of rotation of the third set of rolls to cause said rolls to rotate first in the same direction as the first set of rolls and then in the same direction as the second set of rolls during a sheet transfer action.

34. The combination with an apparatus for intermittently forming sheets of glass, of a leer, conveyor means operating at a surface speed for feeding the formed sheets to the leer at a speed at least as great as the speed of sheet formation, conveyor means operating at a surface speed at least as great as that of the first-named conveyor means for continuing the movement of the sheets through the leer, and means for periodically reversing the direction of travel of at least a part of the second-named conveyor means.

35. The combination with an apparatus for intermittently forming sheets of glass, of a leer, a conveyor operating at a surface speed for feeding the formed sheets to the leer at a speed at least as great as the speed of sheet formation, a second conveyer movable at surface speed at least as great as that of the first conveyor for continuing the movement of the sheets through the leer, means for periodically reversing the direction of movement of the second conveyor, and a third conveyor automatically synchronized with the first and second conveyors successively, for receiving sheets from the former and transferring the same to the latter.

36. The combination with means for forming sheets of glass at determined intervals, of a leer, a set of rolls for feeding the sheets from the forming means to the leer, a set of rolls for continuing the movement of the sheets through the leer, operating means for normally rotating the sets of rolls in sheet advancing direction and periodically reversing the direction of motion of the second set of rolls, a third set of rolls between the aforesaid sets of rolls, and means for synchronizing the third set of rolls with the first and second set of rolls successively, for receiving a sheet from the first set of rolls and transferring the sheet to the second set of rolls.

37. The combination with means for forming sheets of glass at determined intervals, of a leer, conveyor means for conveying the sheets from the forming means to the leer and through the latter, and means for reducing the forward progress of the sheets after travel to a predetermined degree within the leer by periodically reversing the direction of motion of the conveyor means.

38. The combination with means for forming sheets of glass at determined intervals, of a leer, conveyor means for normally conveying the sheets at a rate of speed at least equal to the formation rate of speed from the forming means to and through the leer, and means for retarding the rate of forward travel of the sheets in the leer at one stage of travel of the sheets with respect to an earlier stage of travel of said sheets by periodically reversing the direction of motion of the conveying means.

39. The combination with apparatus for intermittently forming sheets of glass, of a leer, a primary set of conveyor rolls for feeding the sheets from the forming apparatus to the leer, a secondary set of conveyor rolls for transporting the sheets through the leer, transfer rolls for receiving the sheets from the first-named conveyor rolls to the second-named conveyor rolls, means for driving the rolls and normally rotating the primary and secondary sets of rolls in a forward direction, means for periodically rotating the second-named rolls rearwardly, and means for periodically driving the transfer rolls forwardly and rearwardly for successively synchronizing said rolls to coact with the primary rolls for the reception of a sheet therefrom and to then coact with the secondary rolls to deliver the sheet thereto.

40. The combination with apparatus for intermittently forming sheets of glass, of a leer, a primary set of conveyor rolls for feeding the sheets from the forming apparatus to the leer, a secondary set of conveyor rolls for transporting the sheets through the leer, transfer rolls for transferring the sheets from the first-named conveyor rolls to the second-named conveyor rolls, means for driving the rolls and normally rotating the primary and secondary sets of rolls in a forward direction, means for periodically rotating the second-named rolls rearwardly, means for periodically driving the transfer rolls forwardly and rearwardly for successively synchronizing said rolls with the primary rolls for the reception of a sheet therefrom and then with the secondary rolls to deliver the sheet thereto, and means for governing the rolls to effect rotation of all the rolls in a backward direction.

41. The combination with apparatus for intermittently forming sheets of glass, of a leer, a primary conveyor normally movable in a forward direction, for conveying the sheets from the forming apparatus into the leer, a secondary conveyor for continuing the movement of the sheets through the leer, a transfer conveyor for transferring the sheets from the primary conveyor to the secondary conveyor, means for driving the conveyors normally in a forward direction, means for periodically reversing the motion of the second conveyor, means for changing the direction of movement of the transfer conveyor for synchronizing the same successively with the primary and secondary conveyors, and controlled means regulating the actions of said reversing and direction changing means.

42. The combination with intermittently operating sheet forming means, of a leer, a primary conveyor for conveying the sheets from the forming means to the leer, a secondary conveyor for continuing the conveyance of the sheets through the leer, a transfer conveyor for transferring the sheets from the primary conveyor to the secondary conveyor, driving means for normally driving the conveyors in a forward direction, means for periodically reversing the direction of motion of the second conveyor, means for changing the direction of motion of the transfer conveyor for synchronizing actions with the primary and secondary conveyors successively, for receiving sheets from the former and transferring the same to the latter, time controlled means governing said motion reversing and motion changing means, and sheet controlled means for throwing said governing means into and out of action to control the action of the transfer conveyor.

43. The combination with intermittently operating sheet forming means, of a leer, a primary conveyor for conveying the sheets from the forming means to the leer, a secondary conveyor for continuing the conveyance of the sheets through the leer, a transfer conveyor for transferring the sheets from the primary conveyor to the secondary conveyor, driving means for normally driving the conveyors in a forward direction, means for periodically reversing the direction of motion of the second conveyor, means for changing the direction of motion of the transfer conveyor for synchronizing actions with the primary and secondary conveyors successively, for receiving sheets from the former and transferring the same to the latter, time controlled means governing said motion reversing and motion changing means, sheet controlled means for throwing said governing means into and out of action to control the action of the transfer conveyor, and means for varying the time period of action of the time controlled governing means.

44. The combination with intermittently operating sheet forming means, of a leer, a primary conveyor for conveying the sheets from the forming means to the leer, a secondary conveyor for continuing the conveyance of the sheets through the leer, a transfer conveyor for transferring the sheets from the primary conveyor to the secondary conveyor, driving means for normally driving the conveyors in a forward direction, means for periodically reversing the direction of motion of the second conveyor, means for changing the direction of motion of the transfer conveyor for synchronizing actions with the primary and secondary conveyors successively, for receiving sheets from the former and transferring the same to the latter, time controlled electrical means governing said motion reversing and motion changing means, sheet controlled means controlling said governing means to control the action of the transfer conveyor, and means for governing the action of the time controlled governing means to effect a reversal of all the conveyors.

45. The combination with intermittently operating sheet forming means, of a leer, a primary conveyor for conveying the sheets from the forming means to the leer, a secondary conveyor for continuing the conveyance of the sheets through the leer, a transfer conveyor for transferring the sheets from the primary conveyor to the secondary conveyor, driving means for normally driving the conveyors in a forward direction, means for periodically reversing the direction of motion of the second conveyor, means for changing the direction of motion of the transfer conveyor for synchronizing actions with the primary and secondary conveyors successively, for receiving sheets from the former and transferring the same to the latter, a control mechanism governing the driving and reversing and motion changing means, a sheet actuated time controlled switch governing the control mechanism for effecting a forward movement of the transfer conveyor with the primary conveyor, and a sheet actuated time controlled switch governing the control mechanism for maintaining the forward movement of a final part of the transfer conveyor upon cessation of action of the first-named switch until the sheet has passed to the second conveyor.

46. The method of forming and annealing sheet glass, which consists in periodically forming sheets of glass, and then annealing the glass by moving the glass sheets alternately forward a predetermined distance and backwardly a smaller distance in a leer, so as to impart to the sheets a reciprocatory movement while causing them to gradually advance in the leer.

47. The method of annealing glass sheets in a leer by means of a mechanical conveyor, which consists in moving the glass sheets alternately forward a predetermined distance and backwardly a smaller distance so as to impart to the sheets a reciprocatory movement while causing them to gradually advance in the leer.

48. The herein described method of making and annealing glass sheets, which comprises a forming step effected at high speed, and an annealing step during which the sheet is moved periodically backward while having a general rate of forward progression.

49. The herein described method of annealing sheet glass after it has been formed, which comprises receiving and conveying the formed sheet forward on a roller bed, and retarding the advancing movement of the sheet by periodically reversing the rotation of the rollers.

50. The herein described method of making glass sheets and annealing the same in a tunnel lehr, which comprises a forming stage effected at high speed outside the tunnel, a feed stage in which the sheet is transported at formation speed to the tunnel, an annealing stage in which the sheet is carried forward, while being periodically reciprocated, in the tunnel, and a transfer step in which the sheet is shifted from the high speed feed stage to the annealing stage and synchronized in its movements with respect to such stages.

51. The method of forming and annealing glass sheets, which comprises a step of forming the sheet from a batch of glass at a high rate of speed and feeding the sheet at such speed to annealing means, and a step of annealing the glass by feeding the sheet forward through an annealing course while intermittently feeding it rearward a less distance than forward, and so timing the movements of those sheets which are successively formed and fed to the annealing means with respect to the preceding sheets being successively annealed as to maintain a given distance between the latter-named sheets.

52. An apparatus for forming and annealing glass sheets, comprising a forming means, a primary set of rolls for receiving and advancing the sheet from the forming means at forming speed, a set of annealing rolls arranged in groups so as to permit independent rotation of the respective groups of rolls either forward or backward, a set of transfer rolls for transferring the sheets from the primary rolls to the annealing rolls, means for controlling the annealing rolls for normally causing the groups of rolls to rotate forwardly and to periodically rotate rolls of the groups backwardly to reciprocate the sheets and thereby retard their forward feed, and means to render any one or more of the roll groups inoperative for a forward sheet feeding action.

53. The herein described method of making and annealing glass sheets, which comprises a forming and continuous forward feeding stage effected at high speed, an annealing stage during which the sheet is moved periodically backward while having a general forward rate of progression, and an intermediate step during which the sheet is transferred from the first to the second-named stage and synchronized in its movements with respect to such stages.

In testimony whereof I affix my signature.

JULIUS SYLVESTER.